United States Patent
Ikeda et al.

(10) Patent No.: US 9,961,278 B2
(45) Date of Patent: May 1, 2018

(54) SOLID-STATE IMAGE-CAPTURING ELEMENT AND ELECTRONIC DEVICE HAVING IMPROVED LINEARITY

(71) Applicant: Sony Corporation, Tokyo (JP)

(72) Inventors: Yusuke Ikeda, Tokyo (JP); Hideki Shoyama, Fukuoka (JP); Yoshimasa Sakamoto, Fukuoka (JP); Yuuichi Udou, Fukuoka (JP); Oichi Kumagai, Kanagawa (JP)

(73) Assignee: Sony Semiconductor Solutions Corporation, Kanagawa (JP)

( * ) Notice: Subject to any disclaimer, the term of this patent is extended or adjusted under 35 U.S.C. 154(b) by 51 days.

(21) Appl. No.: 15/029,556

(22) PCT Filed: Oct. 10, 2014

(86) PCT No.: PCT/JP2014/077171
§ 371 (c)(1),
(2) Date: Apr. 14, 2016

(87) PCT Pub. No.: WO2015/060143
PCT Pub. Date: Apr. 30, 2015

(65) Prior Publication Data
US 2016/0269659 A1    Sep. 15, 2016

(30) Foreign Application Priority Data
Oct. 21, 2013    (JP) ................................ 2013-218066

(51) Int. Cl.
*H04N 5/355*    (2011.01)
*H04N 5/374*    (2011.01)
(Continued)

(52) U.S. Cl.
CPC ......... *H04N 5/35581* (2013.01); *H04N 5/374* (2013.01); *H04N 5/378* (2013.01);
(Continued)

(58) Field of Classification Search
CPC .. H04N 5/35581; H04N 5/374; H04N 5/3742; H04N 5/378; H04N 9/045
See application file for complete search history.

(56) References Cited

U.S. PATENT DOCUMENTS 8,798,395 B2 * 8/2014 Jo ...................... H04N 5/23254
382/254
2009/0135263 A1 * 5/2009 Sorek ................. H04N 5/35554
348/218.1

(Continued)

FOREIGN PATENT DOCUMENTS

JP    01-166676 A    6/1989
JP    2001-036816 A    2/2001
(Continued)

*Primary Examiner* — Nicholas Giles
(74) *Attorney, Agent, or Firm* — Wolf, Greenfield & Sacks, P.C.

(57) ABSTRACT

The present disclosure relates to a solid-state image-capturing element and electronic device capable of improving the linearity of illuminance values. The dynamic-range expander 118 expands dynamic range of a pixel value for each pixel based on the pixel value having different exposure times of a plurality of pixels. The integrator 119 integrates pixel values having the dynamic range expanded by the dynamic-range expander 118 and generates an illuminance value. The present disclosure is applicable to complementary metal-oxide semiconductor (CMOS) image sensor or the like used in, for example, an illuminometer.

12 Claims, 19 Drawing Sheets

(51) Int. Cl.
*H04N 5/378* (2011.01)
*H04N 9/04* (2006.01)
(52) U.S. Cl.
CPC ........... *H04N 5/3742* (2013.01); *H04N 9/045* (2013.01); *H04N 2209/045* (2013.01)

(56) References Cited

U.S. PATENT DOCUMENTS

| | | | |
|---|---|---|---|
| 2012/0287294 A1 | 11/2012 | Kaizu et al. | |
| 2012/0314124 A1 | 12/2012 | Kaizu et al. | |
| 2013/0021492 A1* | 1/2013 | Tatzuzawa | H04N 5/2252 348/222.1 |
| 2013/0051700 A1* | 2/2013 | Jo | H04N 5/23254 382/284 |
| 2014/0321766 A1* | 10/2014 | Jo | H04N 5/23254 382/255 |
| 2017/0094205 A1* | 3/2017 | Jannard | H04N 5/3532 |

FOREIGN PATENT DOCUMENTS

| | | |
|---|---|---|
| JP | 2012-257193 A | 12/2012 |
| JP | 2013-005017 A | 1/2013 |
| JP | 2013-175897 A | 9/2013 |

\* cited by examiner

SOLID-STATE IMAGE-CAPTURING ELEMENT AND ELECTRONIC DEVICE HAVING IMPROVED LINEARITY

CROSS REFERENCE TO RELATED APPLICATIONS

This application claims the benefit under 35 U.S.C. § 371 as a U.S. National Stage Entry of International Application No. PCT/JP2014/077171, filed in the Japanese Patent Office as a Receiving Office on Oct. 10, 2014, which claims priority to Japanese Patent Application Number JP2013-218066, filed in the Japanese Patent Office on Oct. 21, 2013, each of which applications is hereby incorporated by reference in its entirety.

TECHNICAL FIELD

The present disclosure relates to a solid-state image-capturing element and an electronic device, and in particular, to a solid-state image-capturing element and electronic device capable of improving the linearity of illuminance values.

BACKGROUND ART

In general, in an image sensor, the number of outputs and an analog digital converter (ADC) resolution are outputs ranging from several M to several tens of M and 10 bits, respectively. On the other hand, in an illuminometer, the number of outputs and the ADC resolution are 1 output and 16 bits, respectively. Thus, when an image sensor is used in the illuminometer, output values are necessary to be added and the dynamic range is necessary to be expanded (e.g. refer to Patent Literature 1).

Therefore, in an image sensor used in an illuminometer (hereinafter, referred to as an image sensor for illuminance), a multiple exposure is generally performed for each frame.

Specifically, the image sensor for illuminance first performs imaging with a longer exposure time and integrates each pixel value of the obtained long-term accumulation image to generate a long-term accumulation value. Then, the image sensor for illuminance performs imaging with a shorter exposure time and integrates each pixel value of the obtained short-term accumulation image to generate a short-term accumulation value. The image sensor for illuminance sets the ratio of the exposure time of a long-term accumulation image to an exposure time of the short-term accumulation image as a gain and multiplies the short-term accumulation value by the gain. The image sensor for illuminance selects, as an illuminance value, one of the short-term accumulation value and the long-term accumulation value obtained by the multiplication by the gain, based on the presence or absence of saturation of accumulated charge in all the pixels at the time of capturing the long-term accumulation image. This allows the dynamic range of the illuminance value to be expanded.

However, when the accumulated charge is saturated only in some pixels at the time of capturing the long-term accumulation image, the linearity of the illuminance values is deteriorated because the long-term accumulation value is selected as the illuminance value. In addition, the short-term accumulation value is multiplied by the gain, and thus when the noise caused by the A/D conversion or the like occurs in the pixel value, the noise of the short-term accumulation value obtained by the multiplication by the gain is larger than that of the long-term accumulation value. Thus, the linearity of the illuminance values is deteriorated when the long-term accumulation value is switched to the short-term accumulation value obtained by the multiplication by the gain.

CITATION LIST

Patent Literature

Patent Literature 1: JP 2007-221624A

SUMMARY OF INVENTION

Technical Problem

As described above, in the image sensor for illuminance, in some cases, the linearity of illuminance values is deteriorated.

The present disclosure is made in view of such circumstances, and is intended to improve the linearity of illuminance values.

Solution to Problem

According to a first aspect of the present disclosure, there is provided a solid-state image-capturing element including: a dynamic-range expander configured to expand dynamic range of a pixel value for each pixel based on pixel values having different exposure times of a plurality of pixels; and an integrator configured to integrate the pixel values having the dynamic range expanded by the dynamic-range expander and generate an illuminance value.

An electronic device according to the first embodiment of the present disclosure corresponds to the solid-state image-capturing element according to the first embodiment of the present disclosure.

In the first embodiment of the present disclosure, the dynamic range of the pixel value is expanded for each pixel based on a pixel value having different exposure times of a plurality of pixels, and the pixel values having the expanded dynamic range are integrated, thereby generating an illuminance value.

According to a second aspect of the present disclosure, there is provided a solid-state image-capturing element including: a dynamic-range expander configured to expand dynamic range of an integration value of pixel values of a plurality of pixels based on the pixel value of a first exposure time and the pixel value of a second exposure time of the plurality of pixels; a multiplier configured to generate, as a illuminance value, a value obtained by multiplying the integration value having the dynamic range expanded by the dynamic-range expander by a gain corresponding to a pair of the first exposure time and the exposure time; and a selector configured to select the pair of a next frame of a frame corresponding to the illuminance value generated by the multiplier from multiples of a predetermined pair based on the illuminance value.

An electronic device according to the second embodiment of the present disclosure corresponds to the solid-state image-capturing element according to the second embodiment of the present disclosure.

In the second embodiment of the present disclosure, the dynamic range of an integration value of pixel values of a plurality of pixels is expanded based on a pixel value of a first exposure time and a pixel value of a second exposure time of the plurality of pixels, a value obtained by multiplying the integration value having the expanded dynamic range by a gain corresponding to a pair of the first exposure time and the second exposure time is generated as an illuminance value, and the pair of a next frame of a frame corresponding to the illuminance value is selected from a multiple of a predetermined pair based on the illuminance value.

Advantageous Effects of Invention

According to the present disclosure, it is possible to generate an illuminance value. In addition, according to the present disclosure, it is possible to improve the linearity of illuminance values.

Note that the effects described herein are not necessarily limited, and any effects disclosed herein may be achievable.

DESCRIPTION OF EMBODIMENTS

Premise of Present Disclosure

Figure 1:
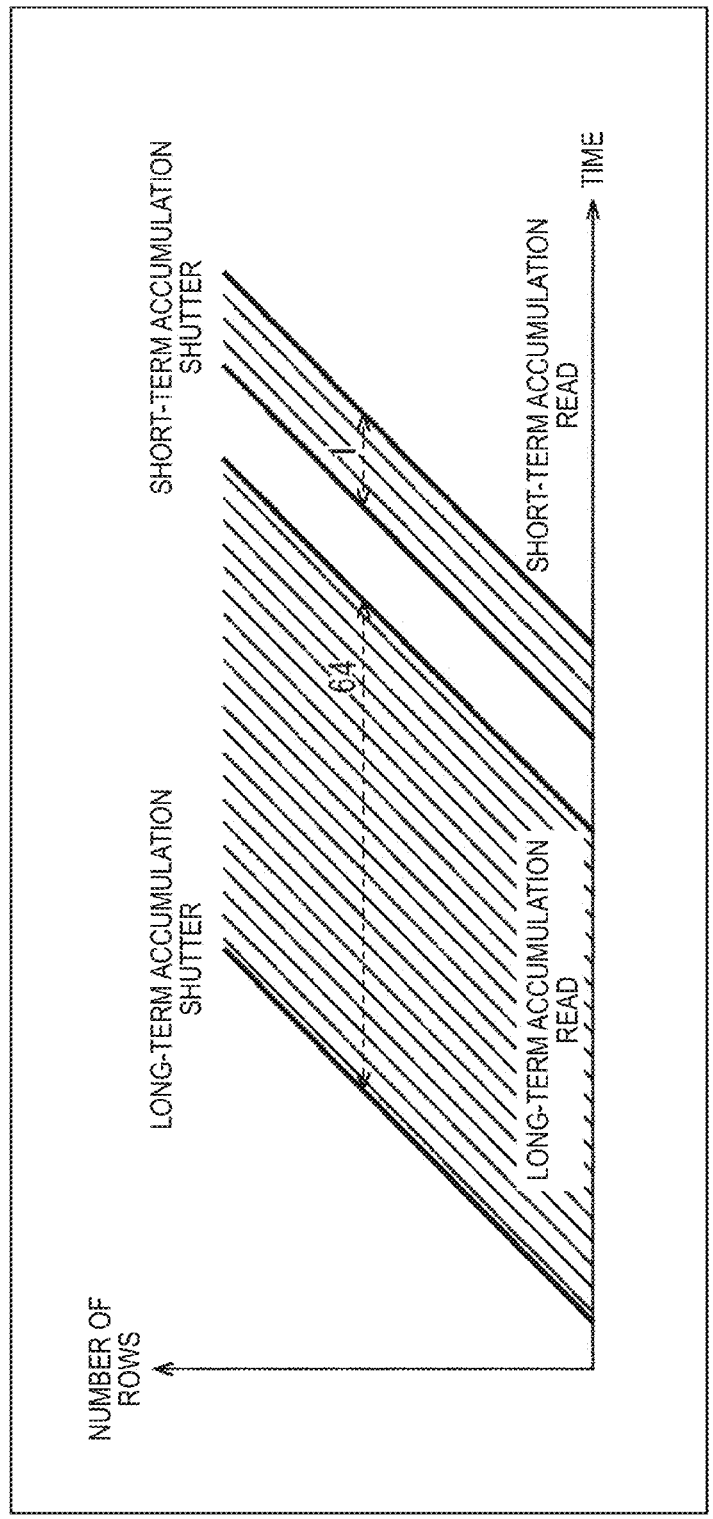
FIG. 1 is a diagram illustrated to describe the exposure of the long-term accumulation image and short-term accumulation image by a multiple-exposure image sensor.

Description of Exposure by Image Sensor for Illuminance in which Multiple Exposure is Performed for Each Frame FIG. 1 is a diagram illustrated to describe the exposure of the long-term accumulation image and short-term accumulation image of an image sensor for illuminance in which a multiple exposure is performed for each frame (hereinafter, referred to as a multiple-exposure image sensor).

In the graph shown in FIG. 1, the horizontal axis represents time, and the vertical axis represents the number of rows from the beginning for each row of a pixel array section in the multiple-exposure image sensor.

As shown in FIG. 1, the multiple-exposure image sensor captures sequentially a long-term accumulation image and a short-term accumulation image in units of frames. In the example of FIG. 1, the multiple-exposure image sensor captures the long-term accumulation image and the short-term accumulation image in this order.

Furthermore, in the example of FIG. 1, the exposure time of the long-term accumulation image is 64 times greater than the exposure time of the short-term accumulation image. In other words, the time ranging from resetting the accumulated charge for each pixel of the long-term accumulation image in units of rows (long-term accumulation shutter) to reading in units of rows (short-term accumulation read) is 64 times greater than the time ranging from resetting the accumulated charge for each pixel of the short-term accumulation image in units of rows (short-term accumulation shutter) to reading in units of rows (short-term accumulation read).

Figure 2:
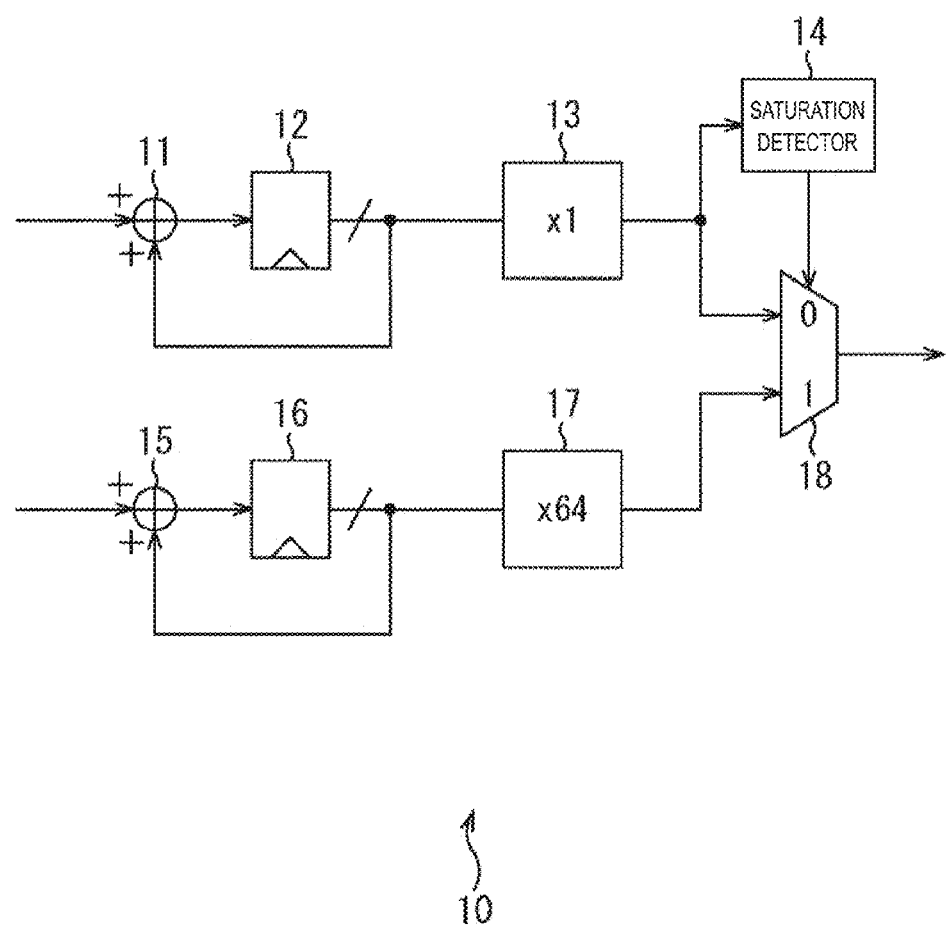
FIG. 2 is a diagram illustrating an exemplary configuration of an illuminance value calculator in the multiple-exposure image sensor.

Exemplary Configuration of Illuminance Value Calculator in Multiple-Exposure Image Sensor FIG. 2 is a diagram illustrating an exemplary configuration of an illuminance value calculator that calculates an illuminance value from the long-term accumulation image and the short-term accumulation value in the multiple-exposure image sensor.

The illuminance value calculator 10 of FIG. 2 is configured to include an adder 11, a register 12, a multiplier 13, a saturation detector 14, an adder 15, a register 16, a multiplier 17, and a selector 18.

The adder 11 receives sequentially each pixel value of the long-term accumulation image captured during the exposure time shown in FIG. 1 as its input. The adder 11 adds the inputted pixel value to a pixel value held in the register 12. The adder 11 supplies a value obtained by the addition to the register 12. The register 12 holds the addition value supplied from the adder 11. The register 12 supplies the held addition value to the adder 11. Thus, the pixel values of the long-term accumulation image inputted to the adder 11 are sequentially integrated. When all pixel values of the long-term accumulation image are integrated, the addition value held in the register 12 is supplied to the multiplier 13.

The multiplier 13 multiplies the addition value supplied from the register 12 by 1 as a gain. The multiplier 13 supplies the value obtained by the multiplication to the saturation detector 14 and the selector 18.

The saturation detector 14, for example, sets a value close to the value obtained by integrating the maximum value of the pixel values of the long-term accumulation image for all the pixel values as a threshold, and compares the threshold with the multiplication value supplied from the multiplier 13. When the multiplication value is smaller than the threshold, the saturation detector 14 generates 0 representing the absence of saturation as a saturation signal that represents the presence or absence of saturation. On the other hand, when the multiplication value is greater than or equal to the threshold, the saturation detector 14 generates 0 representing the presence of saturation as the saturation signal. The saturation detector 14 supplies the saturation signal to the selector 18.

The adder 15 receives sequentially each pixel value of the short-term accumulation image captured during the exposure time shown in FIG. 1 as its input. The adder 15 adds the inputted pixel value to a pixel value held in the register 16. The adder 15 supplies a value obtained by the addition to the register 16. The register 16 holds the addition value supplied from the adder 15. The register 16 supplies the held addition value to the adder 15. Thus, the pixel values of the short-term accumulation image inputted to the adder 15 are sequentially integrated. When all pixel values of the short-term accumulation image are integrated, the addition value held in the register 16 is supplied to the multiplier 17.

The multiplier 17 multiplies the addition value supplied from the register 16 by 64 as a gain. The multiplier 13 supplies the value obtained by the multiplication to the selector 18.

When the saturation signal supplied from the saturation detector 14 is set to 0, the selector 18 selects the multiplication value supplied from the multiplier 13 and divides the selected multiplication value by the number of pixels of the multiple-exposure image sensor. The selector 18 outputs an average value of the pixel values generated thereby as an illuminance value. On the other hand, when the saturation signal is set to 1, the selector 18 selects the multiplication value supplied from the multiplier 17 and divides the selected multiplication value by the number of pixels of the multiple-exposure image sensor. The selector 18 outputs an average value of the pixel values generated thereby as an illuminance value. Thus, the dynamic-range expansion of the illuminance value is performed in units of images.

As shown in FIG. 2, the illuminance value calculator 10 is not necessary to be provided with a frame memory that stores the image at the time of the first exposure (the long-term accumulation image in the example of FIG. 1) to integrate the pixel values.

Description of Illuminance Value

Figure 3:
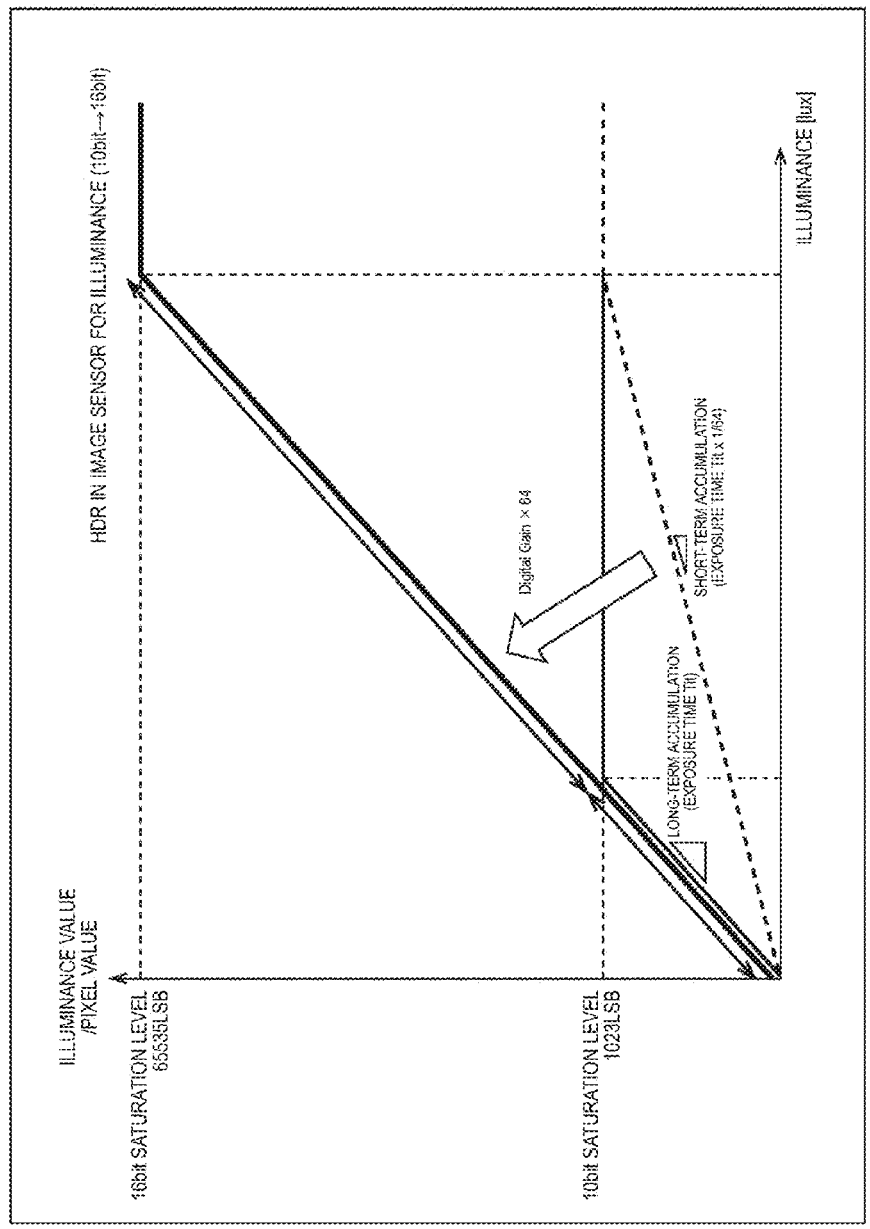
FIG. 3 is a diagram illustrated to describe an illuminance value outputted by a selector of FIG. 2.

FIG. 3 is a diagram illustrated to describe an illuminance value outputted by the selector 18 of FIG. 2.

In FIG. 3, the horizontal axis represents the illuminance of light incident on each pixel of the multiple-exposure image sensor (hereinafter, referred to as incident light), and the vertical axis represents the illuminance value outputted from the selector 18 or the pixel value of each pixel. In the example of FIG. 3, it is assumed that the illuminance of incident light is the same for each pixel and the pixel value is also the same for each pixel.

As shown in FIG. 3, when the accumulated charge of all pixels at the time of capturing the long-term accumulation image is not saturated, the selector 18 outputs the average value of pixel values of the long-term accumulation image having high signal-noise ratio (SNR) as an illuminance value. In addition, when the accumulated charge of all pixels at the time of capturing the long-term accumulation image is saturated, the selector 18 outputs the average value of pixel values of the short-term accumulation image as an illuminance value to expand the dynamic range. Accordingly, the dynamic range of the illuminance values becomes 64 times. Thus, for example, when the number of bits of the pixel value is 10 bits, the number of bits of the illuminance value becomes 16 bits.

Description of Deterioration in Linearity of Illuminance Value

Then, the deterioration in the linearity of illuminance values outputted from the selector 18 of FIG. 2 is described with reference to FIGS. 4 and 5.

Figure 4:
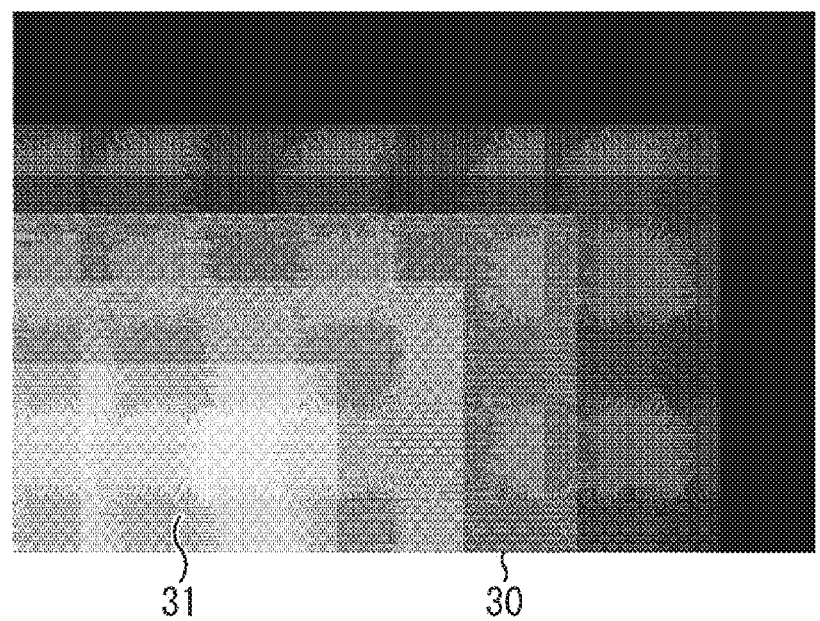
FIG. 4 is a diagram illustrated to describe deterioration in the linearity of illuminance values.
Figure 5:
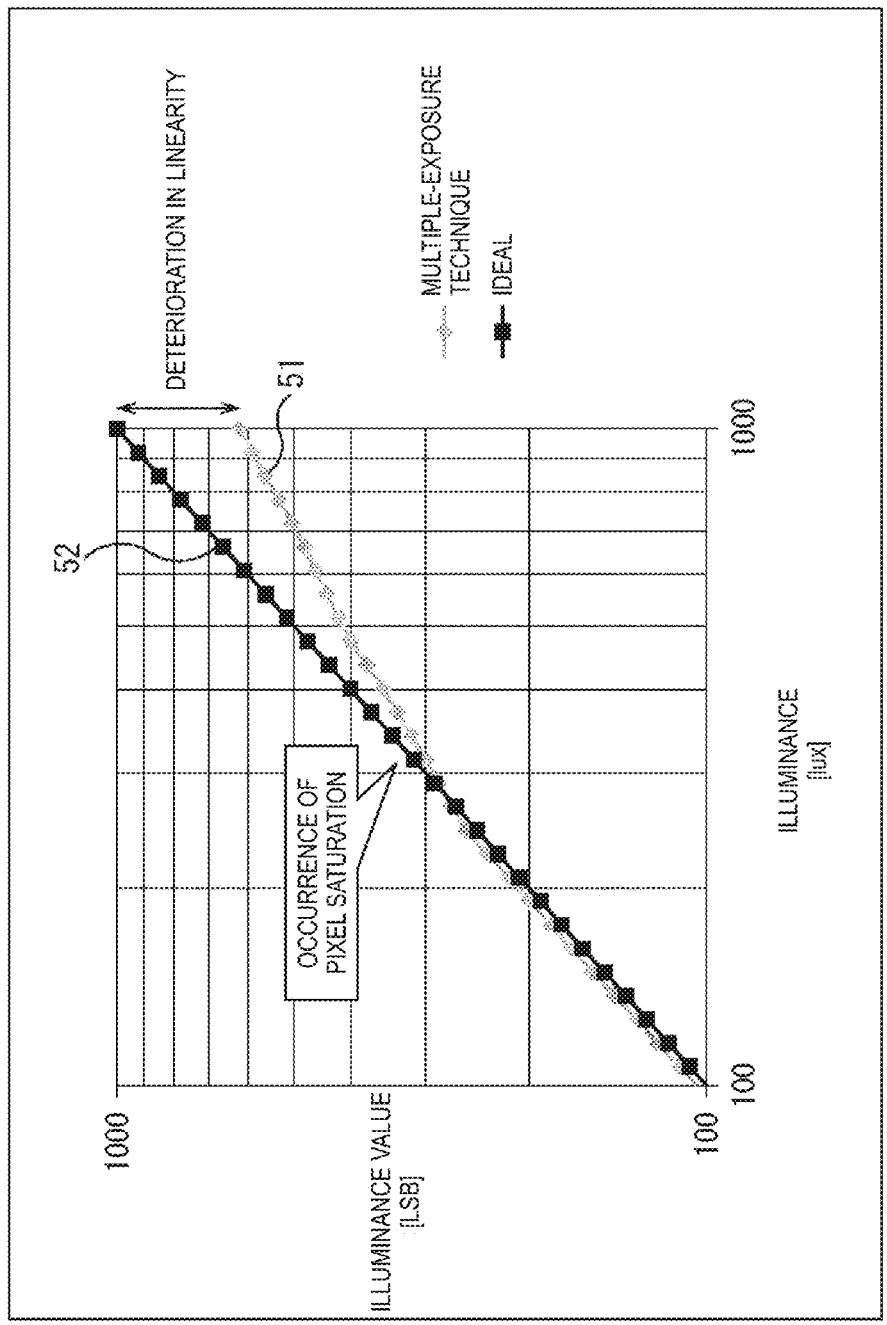
FIG. 5 is a diagram illustrated to describe deterioration in the linearity of illuminance values.

FIG. 4 is a diagram illustrating an example of the long-term accumulation image in which only the accumulated charge in some of pixel groups is saturated during the image capturing.

FIG. 4 illustrates that the higher the concentration, the smaller the pixel value. In the example of FIG. 4, only the accumulated charge in the pixel group corresponding to a lower left region 31 of a long-term accumulation image 30 is saturated, and the pixel value of the region 31 becomes the maximum value regardless of the illuminance of incident light.

In this case, the accumulated charge of all pixels is not saturated at the time of capturing the long-term accumulation image 30, and thus the selector 18 selects the multiplication value of the long-term accumulation image. However, the saturation of the accumulated charge causes the pixel value of the region 31 to fail to be proportional to the illuminance of the incident light. Thus, as shown in FIG. 5, the linearity of illuminance values 51 is deteriorated as compared with the linearity of ideal illuminance values 52 that are proportional to the illuminance of the incident light. In FIG. 5, the horizontal axis represents illuminance and the vertical axis represents illuminance values.

Description of Deterioration in Linearity of Illumination Value

Then, the deterioration in the linearity of illumination values is described with reference to FIG. 6.

Figure 6:
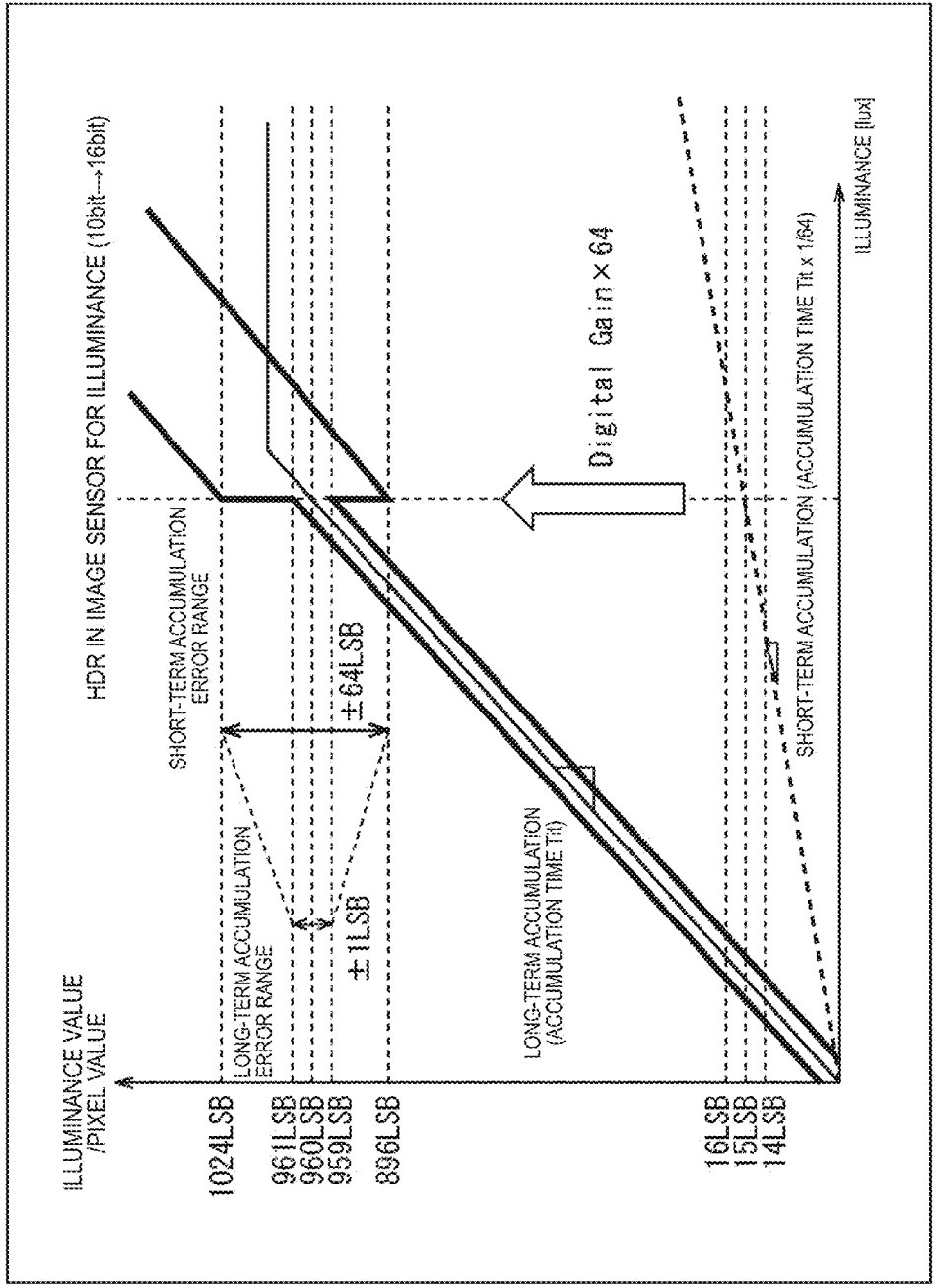
FIG. 6 is a diagram illustrated to describe another example of deterioration in the linearity of illuminance values.

In FIG. 6, the horizontal axis represents the illuminance of incident light for each pixel and the vertical axis represents the illuminance value or the pixel value for each pixel. In the example of FIG. 6, it is assumed that the illuminance of incident light is the same for each pixel and the pixel value is also the same for each pixel. In addition, when the multiplication value of the long-term accumulation image is greater than or equal to 960LSB, the saturation signal is set to 1, and while when it is smaller than 960LSB, the saturation signal is set to 0.

Linearity degradation factors such as noise in a column ADC that performs A/D conversion on an image-capturing signal that is an analog signal of the accumulated charge for each pixel are contained in the pixel value that is a digital value corresponding to the accumulated charge for each pixel. In the multiple-exposure image sensor, the pixel values of all pixels are integrated and thus different noise for each pixel other than the noise in the column ADC is cancelled, accordingly an error caused by such noise is small. However, the noise occurred uniformly for each pixel such as noise in the column ADC is increased with the integration of pixel values, and thus an error caused by such noise is large.

For example, when the error of pixel values due to noise or the like in the column ADC is ±1LSB, the error of the average value of the multiplication values of the long-term accumulation image having the gain of 1 is ±1LSB as shown in FIG. 6. However, the error of the average value of the multiplication values of the short-term accumulation image having the gain of 64 is ±64LSB. Thus, when the selection by the selector 18 is switched, that is, when the saturation signal is switched, the error of the illuminance value varies significantly, and thus the linearity is deteriorated.

In other words, when the selection by the selector 18 is switched, the error of the average value of the multiplication values of the long-term accumulation image varies in the range of 960LSB±1LSB. On the other hand, the pixel values of the short-term accumulation image varies in the range of 15LSB±1LSB, but it is multiplied by 64 as a gain and thus the average value of the multiplication values of the short-term accumulation image varies in the range of 960LSB±64LSB. Thus, when the selection by the selector 18 is switched, the illuminance value is changed from the range of 960LSB±1LSB to the range of 960LSB±64LSB, thereby deteriorating the linearity of illuminance values.

This deterioration in the linearity is improved by reducing the exposure ratio between the short-term accumulation image and the long-term accumulation image, but the reduction in the exposure ratio between the short-term accumulation image and the long-term accumulation image causes the dynamic range of the illuminance values to be small. In other words, in the multiple-exposure image sensor, a relation of trade-off is present between the improvement in the linearity of illuminance values and the expansion of dynamic range of the illuminance values.

First Embodiment

First Configuration Example of First Embodiment CMOS Image Sensor

Figure 7:
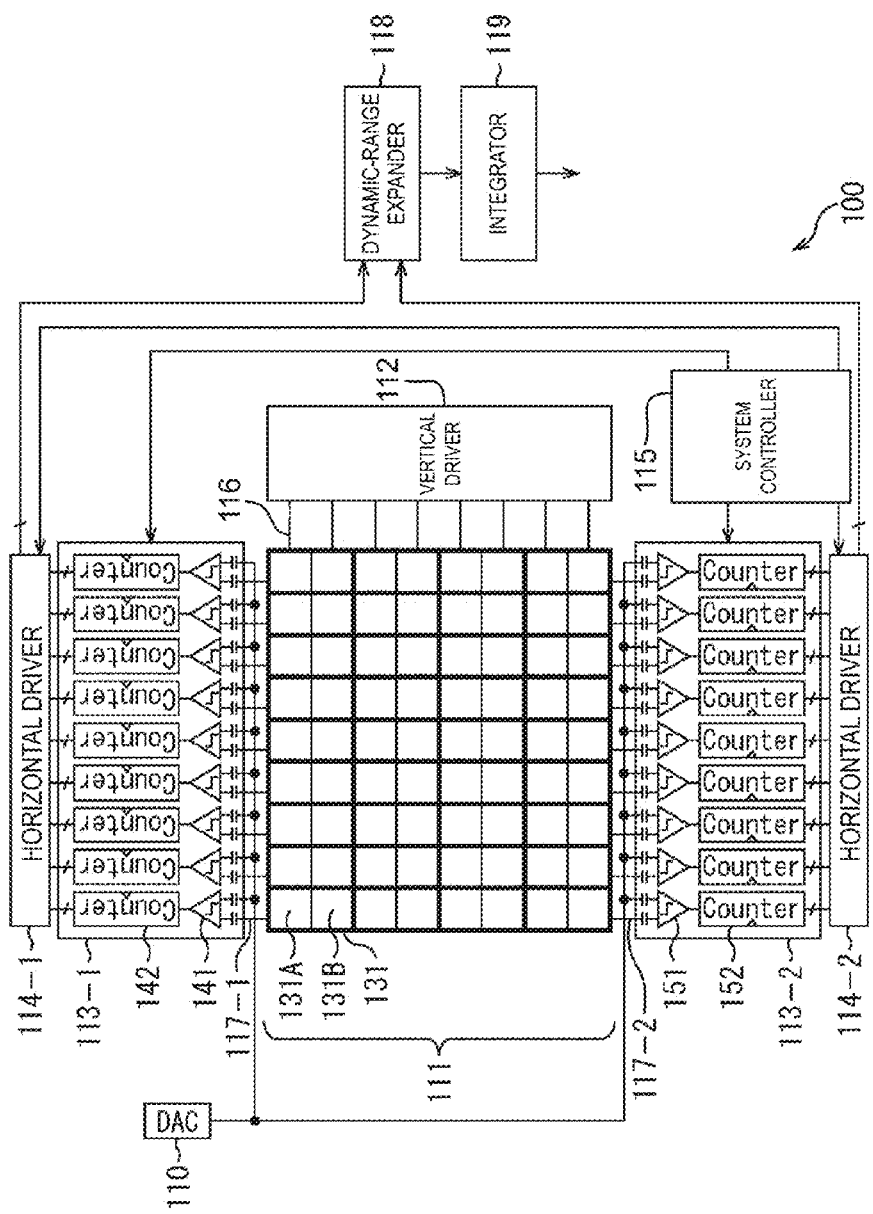
FIG. 7 is a diagram illustrating a first configuration example of a first embodiment of a CMOS image sensor as a solid-state image-capturing element to which the present disclosure is applied.

FIG. 7 is a diagram illustrating a first configuration example of a first embodiment of the CMOS image sensor as a solid-state image-capturing element to which the present disclosure is applied.

A CMOS image sensor 100 is configured to include a digital analog converter (DAC) 110, a pixel array section 111, a vertical driver 112, column ADCs 113-1 and 113-2, horizontal drivers 114-1 and 114-2, a system controller 115, a pixel driving line 116, vertical signal lines 117-1 and 117-2, a dynamic-range expander 118, and an integrator 119.

The DAC 110, the pixel array section 111, the vertical driver 112, the column ADCs 113-1 and 113-2, the horizontal drivers 114-1 and 114-2, the system controller 115, the pixel driving line 116, the vertical signal lines 117-1 and 117-2, the dynamic-range expander 118, and the integrator 119 are formed on a semiconductor substrate which is not shown.

The dynamic-range expander 118 and the integrator 119 are not included in the CMOS image sensor 100, and they may be provided, for example, as an external signal processor such as a digital signal processor (DSP) on a different substrate from the CMOS image sensor 100.

The CMOS image sensor 100 captures an image of a subject and outputs an illuminance value of the captured image.

Specifically, the DAC 110 performs A/D conversion on a predetermined digital value, and generates a reference voltage corresponding to a 10-bit digital value obtained by performing the A/D conversion by the column ADCs 113-1 and 113-2. In this case, the reference voltage is generated sequentially from the digital value of 1. The DAC 110 supplies the generated reference voltage to the column ADCs 113-1 and 113-2.

The pixel array section 111 includes pixels 131 arranged therein two-dimensionally in a matrix. The pixels 131 each includes a short-term accumulation pixel 131A having a shorter exposure time and a long-term accumulation pixel 131B having a longer exposure time. The short-term accumulation pixel 131A and the long-term accumulation pixel 131B each has a photodiode used as a photoelectric conversion device that generates a charge having the charge amount depending on the amount of light (illuminance) incident during the exposure time and accumulates the charge therein. The exposure time of the long-term accumulation pixel 131B is 64 times the exposure time of the short-term accumulation pixel 131A.

The short-term accumulation pixel 131A and the long-term accumulation pixel 131B of the pixel array section 111 are arranged regularly in units of rows. Specifically, the short-term accumulation pixel 131A and the long-term accumulation pixel 131B are arranged by the same number as each other alternately for each row. In the example of FIG. 7, the short-term accumulation pixel 131A and the long-term accumulation pixel 131B are arranged in four rows and nine columns on the pixel array section 111, but the number of the short-term accumulation pixels 131A and the long-term accumulation pixels 131B is not limited thereto.

In the pixel array section 111, the pixel driving line 116 is formed in the lateral direction in the figure (row direction) for each row with respect to the short-term accumulation pixel 131A and the long-term accumulation pixel 131B, and the vertical signal line 117 is formed in the vertical direction in the figure (column direction) for each column. One end of the pixel driving line 116 is connected to an output end (not shown) corresponding to the short-term accumulation pixel 131A or the long-term accumulation pixel 131B of each row of the vertical driver 112.

The vertical driver 112 is configured to include a shift register, an address decoder, or the like. The vertical driver 112 is a pixel-driving unit for driving the short-term accumulation pixel 131A and the long-term accumulation pixel 131B of the pixel array section 111 in units of rows. The specific configuration of the vertical driver 112 is not illustrated, but the vertical driver 112 is configured to include two scanning systems of a read scanning system and a sweeping scanning system.

In the read scanning system, each row of the short-term accumulation pixel 131A and each row of the long-term accumulation pixel 131B are respectively selected sequentially from the top thereof so that an analog signal of the charge accumulated in each of the short-term accumulation pixel 131A and the long-term accumulation pixel 131B is read sequentially from the top thereof in units of rows as an imaging signal simultaneously. In the read scanning system, a transfer pulse is outputted from an output end connected to the pixel driving line 116 in the selected row.

The sweeping scanning system outputs a control pulse from an output end connected to the pixel driving line 116 in each row earlier by the exposure time than the scanning by the read system to sweep out (reset) unnecessary charge from the photodiode of the short-term accumulation pixel 131A and the long-term accumulation pixel 131B. The scanning by the sweeping scanning system allows a so-called electronic shutter operation to be performed for each of the short-term accumulation pixel 131A and the long-term accumulation pixel 131B sequentially for each row. Here, the electronic shutter operation refers to an operation of discarding the charge of the photodiode and starting a new exposure process (starting the accumulation of charge).

The imaging signal outputted from the short-term accumulation pixel 131A in the row selected by the read scanning system of the vertical driver 112 is supplied to the column ADC 113-1 through each of the vertical signal lines 117-1. In addition, the imaging signal outputted from the long-term accumulation pixel 131B in the row selected by the read scanning system of the vertical driver 112 is supplied to the column ADC 113-2 through each of the vertical signal lines 117-2.

The column ADC 113-1 includes a comparator 141 and a counter 142 for each column of the pixel array section 111. The column ADC 113-1 functions as a short-term accumulation converter and performs the A/D conversion process on the imaging signal outputted through the vertical signal line 117-1 from the short-term accumulation pixel 131A in the selected row.

Specifically, the comparator 141 receives an imaging signal of each pixel in the selected row through the vertical signal line 117-1 and also receives a reference voltage from the DAC 110 as its input. The comparator 141 compares the imaging signal to the reference voltage. When the imaging signal is greater than the reference voltage, the comparator 141 inputs the signal to the counter 142. The counter 142 increments its count value when the signal is received from the comparator 141. The initial value of the counter 142 is set to 0.

The column ADC 113-1 performs the process as described above each time the reference voltage is inputted. Thus, the count value becomes a 10-bit digital value corresponding to the imaging signal of each pixel. The counter 142 supplies a 10-bit count value, which is held after the reference voltages corresponding to all the 10-bit digital values are inputted, to the horizontal driver 114-1 as a pixel value, and resets the count value to an initial value.

The horizontal driver 114-1 is configured to include a shift register, an address decoder, or the like, and selects the counter 142 of the column ADC 113-1 sequentially from the left column. This selective scanning by the horizontal driver 114-1 allows the pixel value of the short-term accumulation pixel 131A outputted from the counter 142 of the column ADC 113-1 to be outputted to the dynamic-range expander 118 sequentially from the left column.

The column ADC 113-2 has a comparator 151 and a counter 152 for each column of the pixel array section 11. The column ADC 113-2 functions as a long-term accumulation converter and performs the A/D conversion process, in a similar way to the column ADC 113-1, on the imaging signal outputted through the vertical signal line 117-2 from the long-term accumulation pixel 131B in the selected row. The counter 152 of the column ADC 113-2 supplies a 10-bit pixel value obtained by performing the A/D conversion process to the horizontal driver 114-2, and resets the count value to the initial value.

The horizontal driver 114-2 is configured to include a shift register, an address decoder, or the like, and selects the counter 152 of the column ADC 113-2 sequentially from the left column simultaneously with the horizontal driver 114-1. This selective scanning by the horizontal driver 114-2 allows the pixel value of the long-term accumulation pixel 131B outputted from the counter 152 of the column ADC 113-2 to be outputted to the dynamic-range expander 118 sequentially from the left column simultaneously with the pixel value of the short-term accumulation pixel 131A.

The system controller 115 is configured to include a timing generator or the like that generates various timing signals. The system controller 115 controls the vertical driver 112, the column ADCs 113-1 and 113-2, and the horizontal drivers 114-1 and 114-2 based on various timing signals generated in the timing generator.

The dynamic-range expander 118 multiplies the 10-bit pixel value of the short-term accumulation pixel 131A supplied from the horizontal driver 114-1 by 64 that is the ratio of the exposure time of the long-term accumulation pixel 131B to the exposure time of the short-term accumulation pixel 131A as a gain to obtain a 16-bit multiplication value. The dynamic-range expander 118 determines whether the accumulated charge of the photodiode of the long-term accumulation pixel 131B is saturated based on the pixel value of the long-term accumulation pixel 131B supplied from the horizontal driver 114-2.

The dynamic-range expander 118 selects the 16-bit multiplication value of the short-term accumulation pixel 131A or the 10-bit pixel value of the long-term accumulation pixel 131B based on the determination result. Thus, the expansion of dynamic range is performed on the pixel value in units of pixels. The dynamic-range expander 118 supplies the selected 16-bit multiplication value of the short-term accumulation pixel 131A or the selected 10-bit pixel value of the long-term accumulation pixel 131B to the integrator 119.

The integrator 119 integrates the 16-bit multiplication value of the short-term accumulation pixel 131A or the 10-bit pixel value of the long-term accumulation pixel 131B supplied from the dynamic-range expander 118 by the number of short-term accumulation pixels 131A (long-term accumulation pixels 131B). The integrator 119 divides the resultant integration value by the number of short-term accumulation pixels 131A (long-term accumulation pixels 131B), and outputs the resultant 16-bit average value as an illuminance value.

Figure 8:
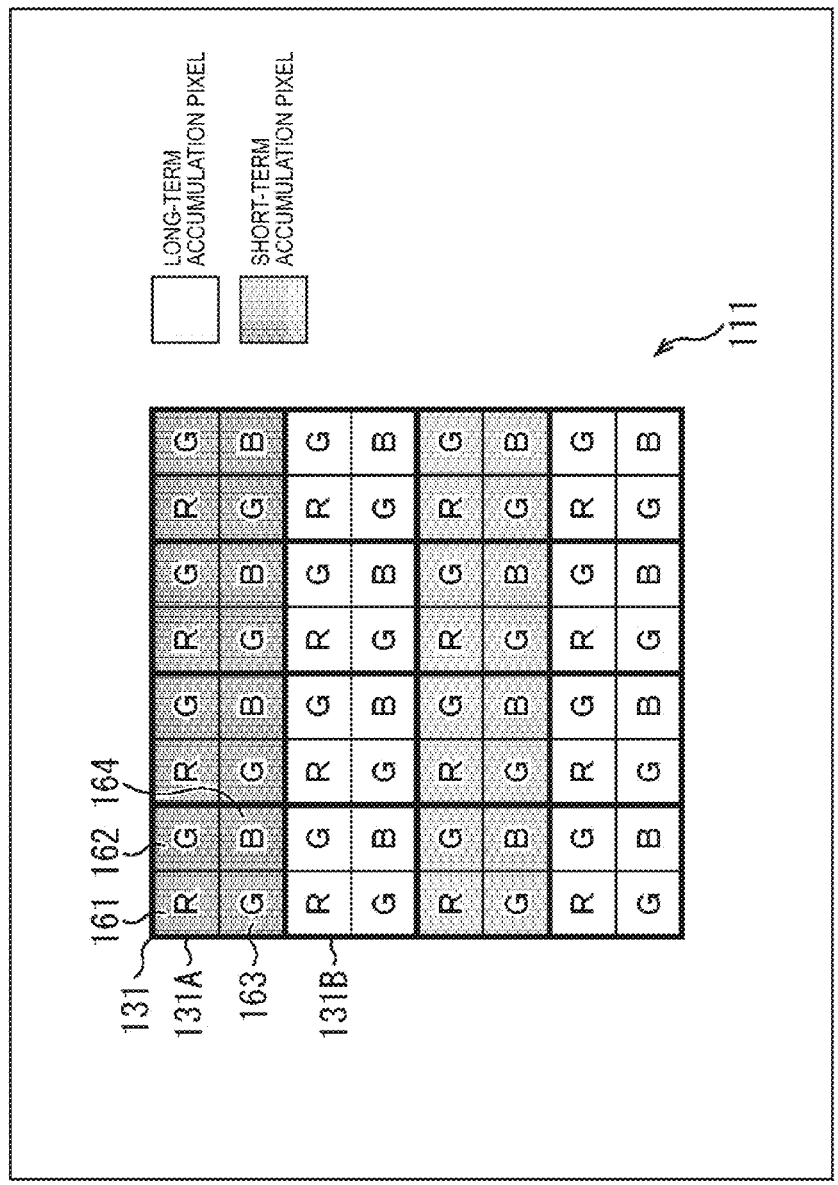
FIG. 8 is a diagram illustrating an exemplary configuration of the short-term accumulation pixel and long-term accumulation pixel in FIG. 7.

Exemplary Configuration of Short-term Accumulation Pixel 131A and Long-term Accumulation Pixel 131B FIG. 8 is a diagram illustrating an exemplary configuration of the short-term accumulation pixel 131A and the long-term accumulation pixel 131B of FIG. 7.

In FIG. 8, the white square represents the long-term accumulation pixel 131B and the gray square represents the short-term accumulation pixel 131A.

As shown in FIG. 8, the short-term accumulation pixel 131A and the long-term accumulation pixel 131B are, for example, pixels arranged in the Bayer array. In other words, the short-term accumulation pixel 131A and the long-term accumulation pixel 131B are each composed of four sub-pixels 161 to 164. In the upper left pixel 161, a red (R) color filter is formed on its surface, and a photodiode of the sub-pixel 161 accumulates red light of the incident light. In the upper right sub-pixel 162 and the lower left sub-pixel 163, a green (G) color filter is formed on their surfaces, and each photodiode of the sub-pixel 162 and the sub-pixel 163 accumulates green light of the incident light. In the lower right sub-pixel 164, a blue (B) color filter is formed on its surface, and a photodiode of the sub-pixel 164 accumulates blue light of the incident light.

The sub-pixels 161 to 164 of the short-term accumulation pixel 131A (long-term accumulation pixel 131B) are herein collectively referred to as the short-term accumulation pixel 131A (long-term accumulation pixel 131B). In addition, the pixel values and the imaging signals of the sub-pixels 161 to 164 are collectively referred to as the pixel value and the imaging signal of the short-term accumulation pixel 131A (long-term accumulation pixel 131B).

Exemplary Configuration of Dynamic-range Expander 118 and Integrator 119

Figure 9:
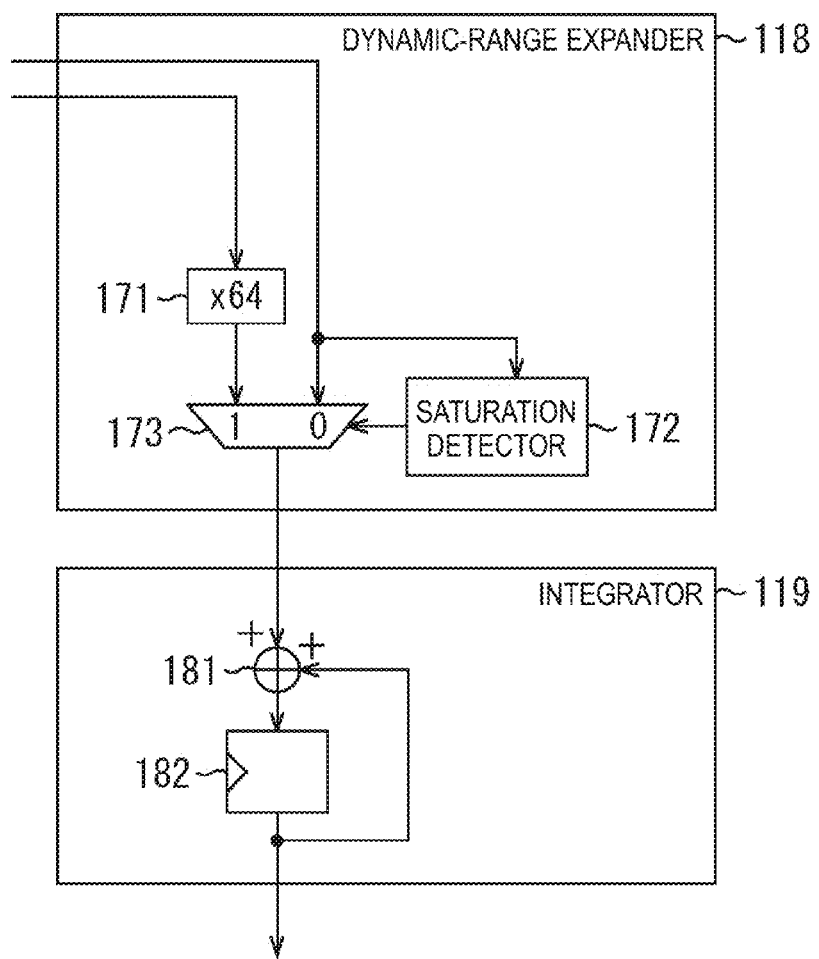
FIG. 9 is a diagram illustrating an exemplary configuration of a dynamic-range expander and an integrator.

FIG. 9 is a diagram illustrating an exemplary configuration of the dynamic-range expander 118 and the integrator 119.

The dynamic-range expander 118 of FIG. 9 is configured to include a multiplier 161, a saturation detector 172, and a selector 173.

The multiplier 171 of the dynamic-range expander 118 multiplies the pixel value of the short-term accumulation pixel 131A supplied from the horizontal driver 114-1 by 64 as a gain, and supplies the resultant multiplication value to the selector 173.

The saturation detector 172 compares the pixel value of the long-term accumulation pixel 131B supplied from the horizontal driver 114-2 to the maximum value of the pixel values of the long-term accumulation pixel 131B, and determines whether the accumulated charge in the photodiode of the long-term accumulation pixel 131B is saturated. The saturation detector 172 supplies a saturation signal representing a result obtained by the determination to the selector 173.

The selector 173 selects one of the multiplication value supplied from the multiplier 171 and the pixel value of the long-term accumulation pixel 131B supplied from the horizontal driver 114-2 based on the saturation signal supplied from the saturation detector 172. In this regard, the arrangement of the pixel array section 111 is as shown in FIG. 8, and the short-term accumulation pixel 131A and the long-term accumulation pixel 131B are each reads sequentially from the left column in the top row. Thus, a color corresponding to the multiplication value of the short-term accumulation pixel 131A inputted to the selector 173 and a color corresponding to the pixel value of the long-term accumulation pixel 131B inputted to the selector 173 are the same. The selector 173 supplies the selected multiplication value of the short-term accumulation pixel 131A or the selected pixel value of the long-term accumulation pixel 131B to the integrator 119.

The integrator 119 is configured to include an adder 181 and a register 182. The adder 181 of the integrator 119 adds the multiplication value of the short-term accumulation pixel 131A supplied from the selector 173 or the pixel value of the long-term accumulation pixel 131B supplied from the selector 173 to an addition value supplied from the register 182. The adder 181 supplies an addition value to the register 182.

The register 182 holds the addition value supplied from the adder 181. The register 182 supplies the held addition value to the adder 181 when the adder 181 performs the addition. When the multiplication value of the short-term accumulation pixel 131A or the pixel value of the long-term accumulation pixel 131B is added by the number of the short-term accumulation pixels 131A (long-term accumulation pixels 131B) arranged in the pixel array section 111, the register 182 divides the held addition value by the number of the short-term accumulation pixels 131A (long-term accumulation pixels 131B) and outputs an average value of the divided values as an illuminance value.

Description of Illuminance Value

Figure 10:
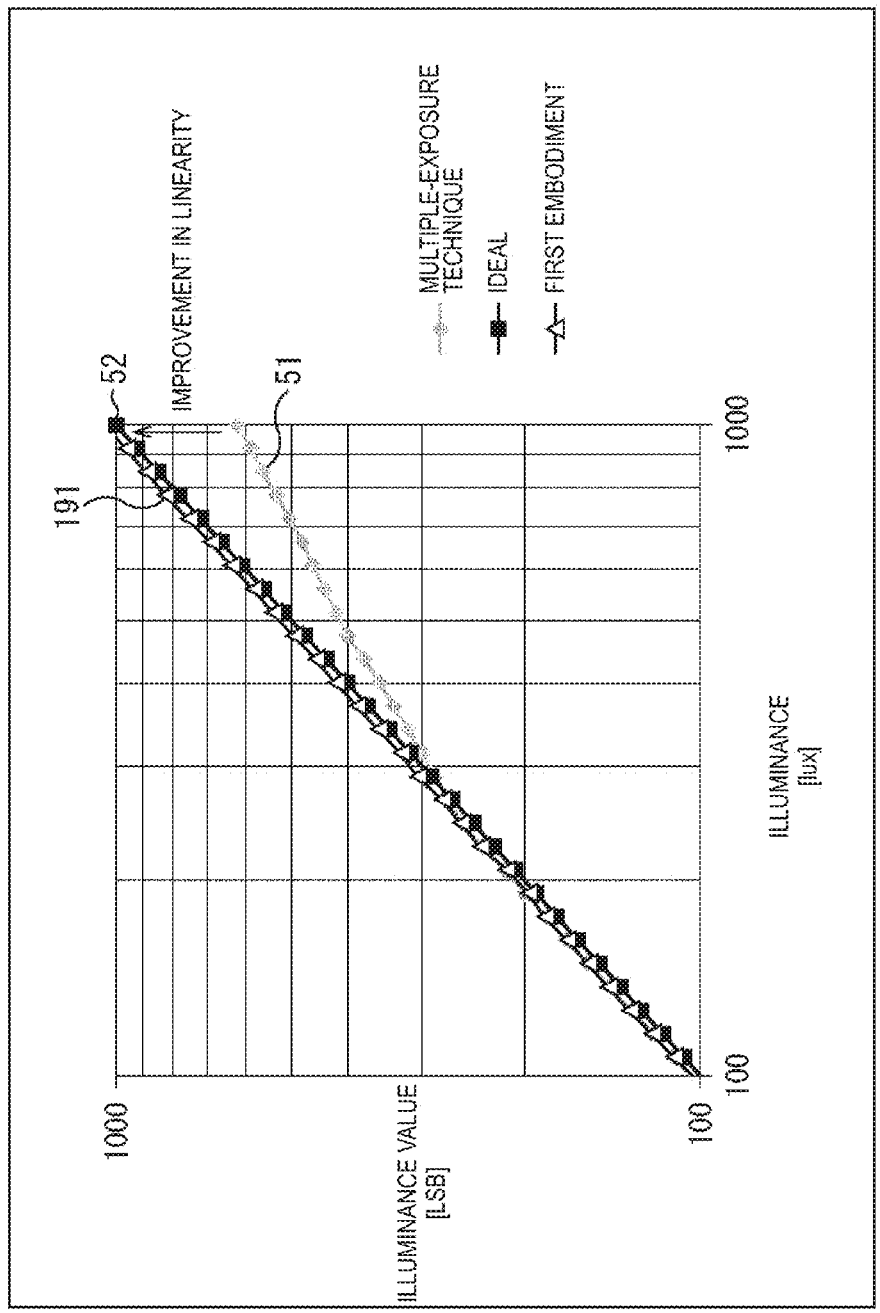
FIG. 10 is a diagram illustrated to describe an illuminance value outputted from the CMOS image sensor in FIG. 7.

FIG. 10 is a diagram illustrated to describe an illuminance value outputted from the CMOS image sensor 100.

In the example of FIG. 10, the long-term accumulation image captured by the long-term accumulation pixel 131B in the pixel array section 111 is the long-term accumulation image 30 in which only the accumulated charge in some of the long-term accumulation pixels 131B is saturated as shown in FIG. 4.

In this case, as described with reference to FIG. 5, the linearity of the illuminance value 51 outputted from the multiple-exposure image sensor provided with the illuminance value calculator 10 of FIG. 2 is deteriorated as compared with the linearity of the ideal illuminance value 52.

In contrast, in the CMOS image sensor 100, whether the accumulated charge is saturated is determined for each long-term accumulation pixel 131B. Thus, the integration value of the short-term accumulation pixel 131A whose accumulated charge is not saturated is selected as a pixel value obtained by performing the dynamic-range expansion on the region 31 corresponding to the long-term accumulation pixel 131B whose accumulated charge is saturated. This allows the pixel value obtained by performing the dynamic-range expansion on the region 31 used to calculate the illuminance value to be proportional to the illuminance of the incident light.

Thus, the linearity of the illuminance value 191 outputted from the CMOS image sensor 100 is improved as compared with the linearity of the illuminance value 51 and is close to the linearity of the ideal illuminance value 52.

Furthermore, in the multiple-exposure image sensor, when the determination of whether the accumulated charge is saturated is performed for each pixel, it is necessary to be provided with a frame memory to hold an image during the first exposure. However, the CMOS image sensor 100 obtains the pixel values of the short-term accumulation pixel 131A and the long-term accumulation pixel 131B simultaneously, and thus it is not necessary to be provided with a frame memory. Thus, the CMOS image sensor 100 makes it possible to improve the linearity of illuminance values without increasing the size and power consumption.

Description of Process by CMOS Image Sensor 100

Figure 11:
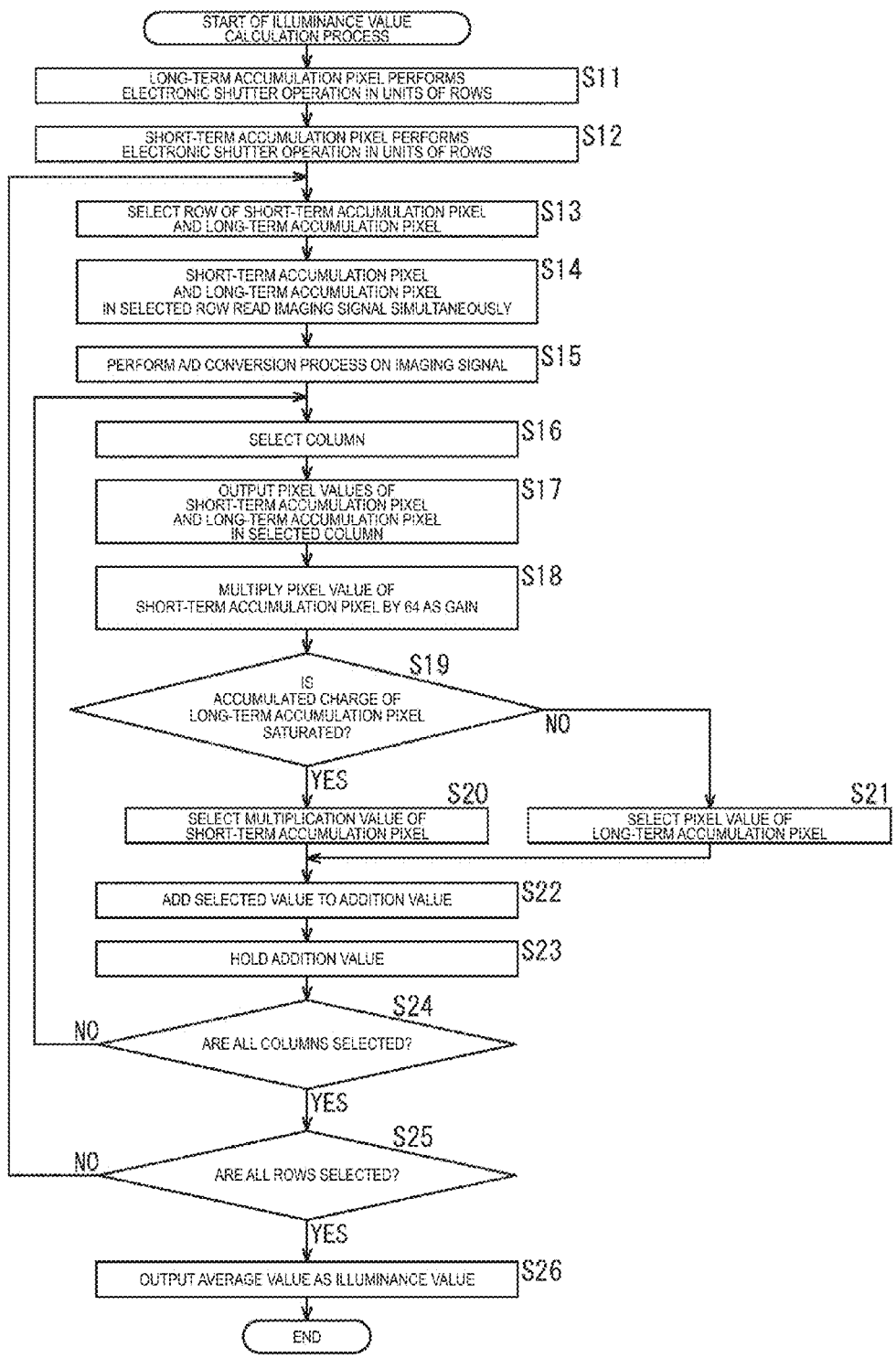
FIG. 11 is a flowchart illustrated to describe an illuminance value calculation process by the CMOS image sensor in FIG. 7.

FIG. 11 is a flowchart illustrated to describe an illuminance value calculation process by the CMOS image sensor 100 of FIG. 7. The illuminance value calculation process is performed in units of frames.

In step S11 of FIG. 11, the long-term accumulation pixel 131B performs the electronic shutter operation in units of rows earlier, by the exposure time, than the scanning by the read system depending on a control pulse supplied from the sweeping scanning system of the vertical driver 112 through the pixel driving line 116.

In step S12, the short-term accumulation pixel 131A performs the electronic shutter operation in units of rows earlier, by the exposure time, than the scanning by the read system depending on the control pulse supplied from the sweeping scanning system of the vertical driver 112 through the pixel driving line 116.

In step S13, the read scanning system of the vertical driver 112 selects the row of the short-term accumulation pixel 131A and the long-term accumulation pixel 131B. First, in the process in step S13, the read scanning system selects the top row of each of the short-term accumulation pixel 131A and the long-term accumulation pixel 131B. The read scanning system outputs a transfer pulse from the output end connected to the pixel driving line 116 in the selected row.

In step S14, the short-term accumulation pixel 131A in the selected row reads an imaging signal depending on the transfer pulse supplied by the pixel driving line 116 and supplies the signal to the column ADC 113-1 through the vertical signal line 117-1. At the same time, the long-term accumulation pixel 131B in the selected row reads an imaging signal depending on the transfer pulse supplied by the pixel driving line 116 and supplies the signal to the column ADC 113-2 through the vertical signal line 117-2.

In step S15, the column ADC 113-1 and the column ADC 113-2 perform the A/D conversion process on the inputted imaging signal. The column ADC 113-1 supplies the pixel value obtained by performing the A/D conversion process to the horizontal driver 114-1. The column ADC 113-2 supplies the pixel value obtained by performing the A/D conversion process to the horizontal driver 114-2.

In step S16, the horizontal driver 114-1 selects a column of the counter 142 of the column ADC 113-1. In addition, the horizontal driver 142-2 selects a column of the counter 152 of the column ADC 113-2. In the process to be performed in step S16 immediately after the process in step S15, the horizontal driver 114-1 and the horizontal driver 114-2 selects the leftmost column.

In step S17, the horizontal driver 114-1 outputs the pixel value of the short-term accumulation pixel 131A outputted from the counter 142 in the selected column to the dynamic-range expander 118. In addition, the horizontal driver 114-2 outputs the pixel value of the long-term accumulation pixel 131B outputted from the counter 152 in the selected column to the dynamic-range expander 118.

In step S18, the multiplier 171 (FIG. 9) of the dynamic-range expander 118 multiplies the pixel value of the short-term accumulation pixel 131A supplied from the horizontal driver 114-1 by 64 as a gain and supplies the resultant multiplication value to the selector 173.

In step S19, the saturation detector 172 determines whether the accumulated charge of the photodiode of the long-term accumulation pixel 131B is saturated based on the pixel value of the long-term accumulation pixel 131B supplied from the horizontal driver 114-2 and the maximum value of the pixel values of the long-term accumulation pixel 131B.

Specifically, if the pixel value of the long-term accumulation pixel 131B is smaller than the maximum value of the pixel values of the long-term accumulation pixel 131B, the saturation detector 172 determines that the accumulated charge of the photodiode of the long-term accumulation pixel 131B is not saturated. On the other hand, if the pixel value of the long-term accumulation pixel 131B is the maximum value of the pixel values of the long-term accumulation pixel 131B, the saturation detector 172 determines that the accumulated charge of the photodiode of the long-term accumulation pixel 131B is saturated.

If it is determined in step S19 that the accumulated charge of the photodiode of the long-term accumulation pixel 131B is saturated, the saturation detector 172 generates a value of 1 representing the presence of saturation as a saturation signal and supplies it to the selector 173. Then, in step S20, the selector 173 selects the multiplication value of the short-term accumulation pixel 131A supplied from the multiplier 171 based on the value of 1 as the saturation signal supplied from the saturation detector 172, and supplies it to the integrator 119. Then, the process proceeds to step S22.

On the other hand, if it is determined in step S19 that the accumulated charge of the photodiode of the long-term accumulation pixel 131B is not saturated, the saturation detector 172 generates a value of 0 representing the absence of saturation as a saturation signal and supplies it to the selector 173. Then, in step S21, the selector 173 selects the multiplication value of the long-term accumulation pixel 131B supplied from the horizontal driver 114-2 based on the value of 0 as the saturation signal supplied from the saturation detector 172, and supplies it to the integrator 119. Then, the process proceeds to step S22.

In step S22, the adder 181 (FIG. 9) of the integrator 119 adds the multiplication value of the short-term accumulation pixel 131A selected by the selector 173 or the pixel value of the long-term accumulation pixel 131B to the addition value supplied from the register 182. The adder 181 supplies the addition value to the register 182.

In step S23, the register 182 holds the addition value supplied from the adder 181. This addition value is added to one of the multiplication value of the short-term accumulation pixel 131A and the pixel value of the long-term accumulation pixel 131B, which are selected by the selector 173 in the process in the subsequent step S22.

In step S24, the horizontal driver 114-1 and the horizontal driver 114-2 determine whether all the columns of the short-term accumulation pixel 131A and the long-term accumulation pixel 131B in the pixel array section 111 are selected in the process of step S16.

If it is determined in step S24 that not all the columns are yet selected, the process returns to step S16, and the right column of the column selected in the immediately previous step S16 is selected. Then, the processes in steps S17 to S24 are repeated until all the columns are selected.

On the other hand, if it is determined in step S24 that all the columns are selected, then in step S25, the read scanning system of the vertical driver 112 determines whether all the rows of the short-term accumulation pixel 131A and the long-term accumulation pixel 131B of the pixel array section 111 are selected.

If it is determined in step S25 that not all the rows are yet selected, the process returns to step S13, and the column under the row selected in the immediately previous step S13 is selected. The processes in steps S14 to S25 are repeated until the all the rows are selected.

On the other hand, if it is determined in step S25 that all the rows are selected, the register 182 outputs an average value obtained by dividing the held addition value by the number of the short-term accumulation pixel 131A (long-term accumulation pixel 131B) as an illuminance value. Then, the process is terminated.

As described above, the image sensor 100 of FIG. 7 expands the dynamic range of the pixel value for each pixel based on the pixel value having different exposure times, and integrates the pixel values having the expanded dynamic range, thereby generating an illuminance value. Thus, it is possible to improve the linearity of illuminance values.

Furthermore, the image sensor 100 is provided with the short-term accumulation pixel 131A and the long-term accumulation pixel 131B separately, and thus it is possible to obtain simultaneously the pixel values having different exposure times. Thus, it is possible to expand the dynamic range of the pixel value for each pixel without being provided with a frame memory used to hold an image having any one of the exposure times. Accordingly, it is possible to improve the linearity of illuminance values without increasing the size and power consumption.

Second Configuration Example of First Embodiment of CMOS Image Sensor

Figure 12:
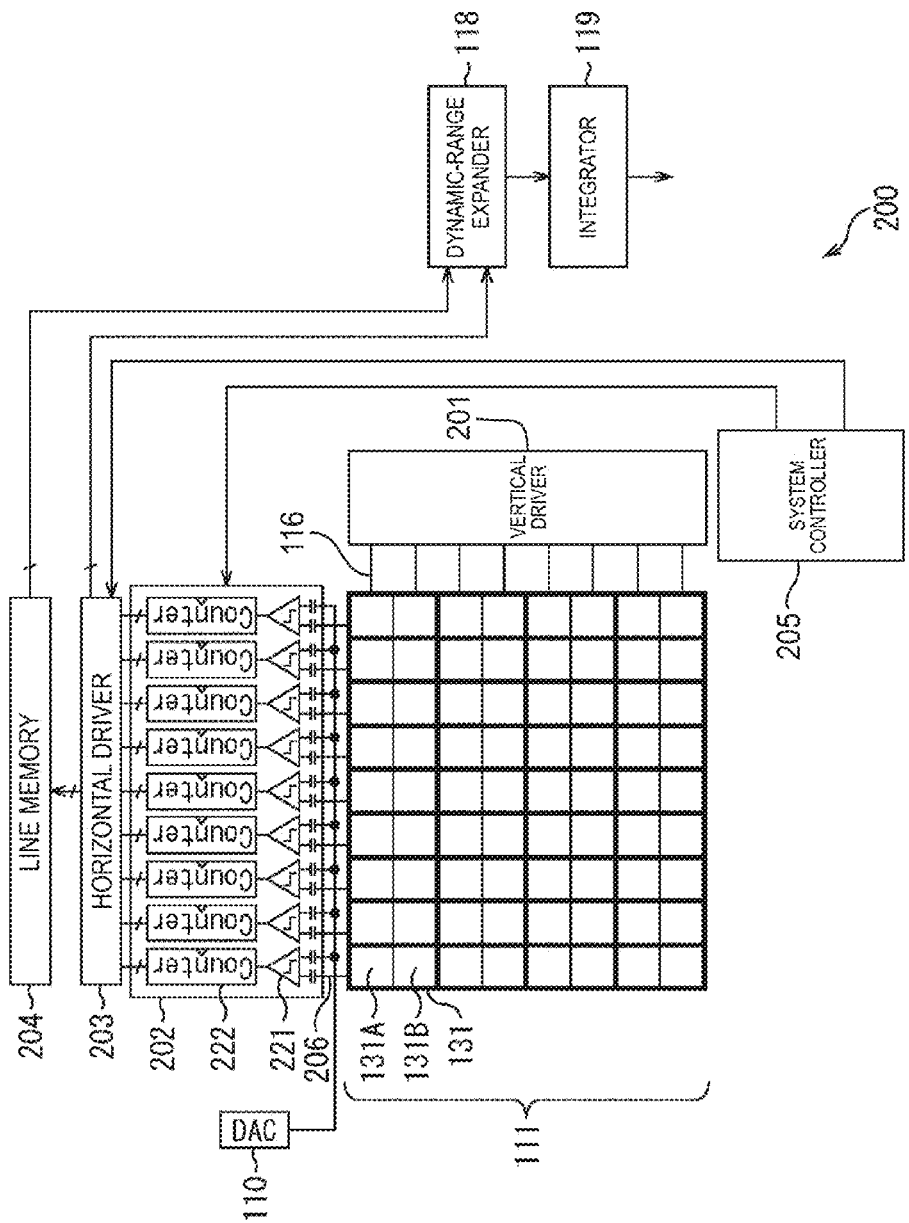
FIG. 12 is a diagram illustrating a second configuration example of the first embodiment of the CMOS image sensor as the solid-state image-capturing element to which the present disclosure is applied.

FIG. 12 is a diagram illustrating a second configuration example of the first embodiment of the CMOS image sensor used as the solid-state image-capturing element to which the present disclosure is applied.

In the configuration shown in FIG. 12, the same components as those of FIG. 7 are denoted with the same reference numbers. The repeated description thereof is omitted as appropriate.

The configuration of a CMOS image sensor 200 in FIG. 12 is different from that of the CMOS image sensor in FIG. 7 in that a vertical driver 201, a column ADC 202, a horizontal driver 203, a system controller 205, and a vertical signal line 206 are provided instead of the vertical driver 112, the column ADCs 113-1 and 113-2, the horizontal drivers 114-1 and 114-2, the system controller 115, and the vertical signal lines 117-1 and 117-2, respectively, and a line memory 204 is further provided.

In the CMOS image sensor 200, the column ADCs 113-1 and 113-2 and the horizontal drivers 114-1 and 114-2 are respectively made to be common.

Specifically, the vertical driver 201 of the CMOS image sensor 200 is configured to include a shift register, an address decoder, or the like, which is similar to the vertical driver 112 shown in FIG. 7. The vertical driver 201 is a pixel-driving unit for driving the short-term accumulation pixel 131A and the long-term accumulation pixel 131B of the pixel array section 111 in units of rows. The specific configuration of the vertical driver 201 is not illustrated, but the vertical driver 201 is configured to include two scanning systems of a read scanning system and a sweeping scanning system.

In the read scanning system, each row of the short-term accumulation pixel 131A and each row of the long-term accumulation pixel 131B are selected sequentially from the top thereof in an alternate manner so that an analog signal of a charge accumulated in each of the short-term accumulation pixel 131A and the long-term accumulation pixel 131B is read alternately in units of rows as an imaging signal simultaneously. In the read scanning system, a transfer pulse is outputted from an output end connected to the pixel driving line 116 in the selected row. The sweeping scanning system of the vertical driver 201 is similar to the sweeping scanning system of the vertical driver 112.

The imaging signal outputted from the short-term accumulation pixel 131A or the long-term accumulation pixel 131B in the selected row by the read scanning system of the vertical driver 201 is supplied to the column ADC 202 through each of the vertical signal lines 206.

The column ADC 202 includes a comparator 221 and a counter 222 for each column of the pixel array section 111, which is similar to the column ADCs 113-1 and 113-2 shown in FIG. 7. The column ADC 202 functions as a converter and performs the A/D conversion process on the imaging signal outputted through the vertical signal line 206 from the short-term accumulation pixel 131A or the long-term accumulation pixel 131B in the selected row. The column ADC 202 supplies a 10-bit pixel value obtained by performing the A/D conversion process to the horizontal driver 203.

The horizontal driver 203 is configured to include a shift register, an address decoder, or the like, which is similar to the horizontal drivers 114-1 and 114-2 shown in FIG. 7. The horizontal driver 203 selects the counter 222 of the column ADC 202 sequentially from the left column. This selective scanning by the horizontal driver 203 allows the pixel value of the short-term accumulation pixel 131A outputted from the counter 222 of the column ADC 202 to be outputted to the line memory 204 sequentially from the left column. In addition, the pixel value of the long-term accumulation pixel 131B outputted from the counter 222 of the column ADC 202 is outputted to the dynamic-range expander 118 sequentially from the left column.

The line memory 204 functions as a storage unit and holds the pixel value for one row of the short-term accumulation pixel 131A supplied sequentially from the horizontal driver 203. The line memory 204 reads the pixel value of the short-term accumulation pixel 131A being held sequentially from the oldest, and outputs it to the dynamic-range expander 118 simultaneously with the output of the pixel value of the long-term accumulation pixel 131B from the horizontal driver 203.

The system controller 205 is configured to include a timing generator or the like used to generate various timing signals. The system controller 205 controls the vertical driver 201, the column ADC 202, and the horizontal driver 203 based on various timing signals generated by the timing generator.

Description of Process by CMOS Image Sensor 200

Figure 13:
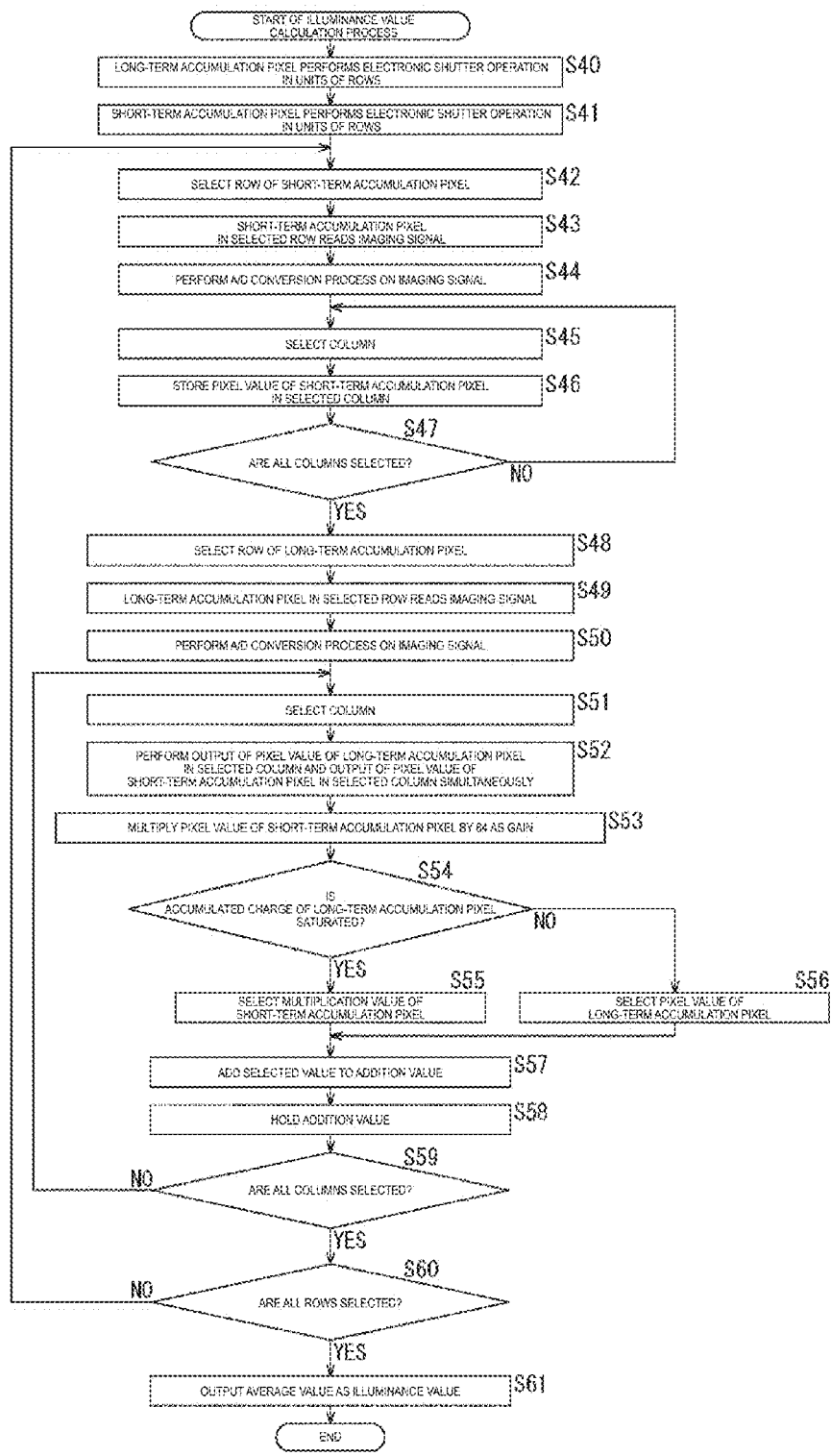
FIG. 13 is a flowchart illustrated to describe an illuminance value calculation process by the CMOS image sensor in FIG. 12.

FIG. 13 is a flowchart illustrated to describe an illuminance value calculation process to be performed by the CMOS image sensor 200 shown in FIG. 12. The description of the illuminance value calculation process is performed in units of frames.

The processes in steps S40 and S41 of FIG. 13 are similar to those in steps S11 and S12 of FIG. 11, and thus the description thereof is omitted.

In step S42, the read scanning system of the vertical driver 201 selects the row of the short-term accumulation pixel 131A. First, in the process in step S42, the read scanning system selects the top row of the short-term accumulation pixel 131A. The read scanning system outputs a transfer pulse from the output end connected to the pixel driving line 116 in the selected row.

In step S43, the short-term accumulation pixel 131A in the selected row reads an imaging signal depending on the transfer pulse supplied by the pixel driving line 116 and supplies it to the column ADC 202 through the vertical signal line 206.

In step S44, the column ADC 202 performs the A/D conversion process on the imaging signal supplied from the short-term accumulation pixel 131A in the selected row and supplies the pixel value obtained by performing the A/D conversion process to the horizontal driver 203.

In step S45, the horizontal driver 203 selects a column of the counter 222 of the column ADC 202. In the process to be performed in step S45 immediately after the process in step S44, the horizontal driver 203 selects the leftmost column.

In step S46, the horizontal driver 203 outputs the pixel value of the short-term accumulation pixel 131A outputted from the counter 222 in the selected column to the line memory 204 and causes the line memory 204 to store it.

In step S47, the horizontal driver 203 determines whether all the columns of the short-term accumulation pixel 131A are selected. If it is determined in step S47 that not all the columns of the short-term accumulation pixel 131A are yet selected, the process returns to step S45 and the right column of the column selected in the immediately previous step S45 is selected. Then, the processes in steps S46 and S47 are repeated until all the columns are selected.

On the other hand, if it is determined in step S47 that all the columns of the short-term accumulation pixel 131A are selected, the read scanning system of the vertical driver 201 selects the row of the long-term accumulation pixel 131B in step S48. First, in the process of step S48, the read scanning system selects the top row of the long-term accumulation pixel 131B. The read scanning system outputs a transfer pulse from an output end connected to the pixel driving line 116 in the selected row.

In step S49, the long-term accumulation pixel 131B in the selected row reads an imaging signal depending on the transfer pulse supplied by the pixel driving line 116 and supplies it to the column ADC 202 through the vertical signal line 206.

In step S50, the column ADC 202 performs the A/D conversion process on the imaging signal supplied from the long-term accumulation pixel 131B in the selected row and supplies the pixel value obtained by performing the A/D conversion process to the horizontal driver 203.

In step S51, the horizontal driver 203 selects the row of the counter 222 of the column ADC 202. In the process of step S51 immediately after the process in step S50, the horizontal driver 203 selects the leftmost column.

In step S52, the horizontal driver 203 outputs the pixel value of the long-term accumulation pixel 131B in the selected column outputted from the counter 222 in the selected column to the dynamic-range expander 118. At the same time, the line memory 204 reads the same column as that of the long-term accumulation pixel 131B, that is, the pixel value of the short-term accumulation pixel 131A in the selected column, and outputs it to the dynamic-range expander 118.

The processes in steps S53 to S59 are similar to those in steps S18 to S24 of FIG. 11, and thus description thereof is omitted.

If it is determined in step S59 that not all the columns are yet selected, the process returns to step S51 and the right column of the column selected in the immediately previous step S51 is selected. Then, the processes in steps S52 to S59 are repeated until all the columns are selected.

On the other hand, if it is determined in step S59 that all the columns are selected, then the process proceeds to step S60. The processes in steps S60 and S61 are similar to those in steps S25 and S26 of FIG. 11, and thus description thereof is omitted. When the process in step S61 is completed, the process is terminated.

As described above, the CMOS image sensor 200 of FIG. 12 provided with the line memory 204 allows the column ADC and the horizontal driver to be shared between the short-term accumulation pixel 131A and the long-term accumulation pixel 131B. Accordingly, it is possible to reduce the size of the circuit.

The CMOS image sensor 100 and the CMOS image sensor 200 may be configured to expand the dynamic range of the pixel value for each plurality of pixels 131 rather than to expand the dynamic range of the pixel value for each pixel 131. In this case, the saturation of the accumulated charge in the plurality of long-term accumulation pixels 131B is determined based on the integration value obtained by integrating the pixel values of the plurality of long-term accumulation pixels 131B. The multiplication value of the short-term accumulation pixel 131A and the pixel value of the long-term accumulation pixel 131B are selected for each plurality of pixels based on the determination result.

Second Embodiment

Exemplary Configuration of Second Embodiment of CMOS Image Sensor

Figure 14:
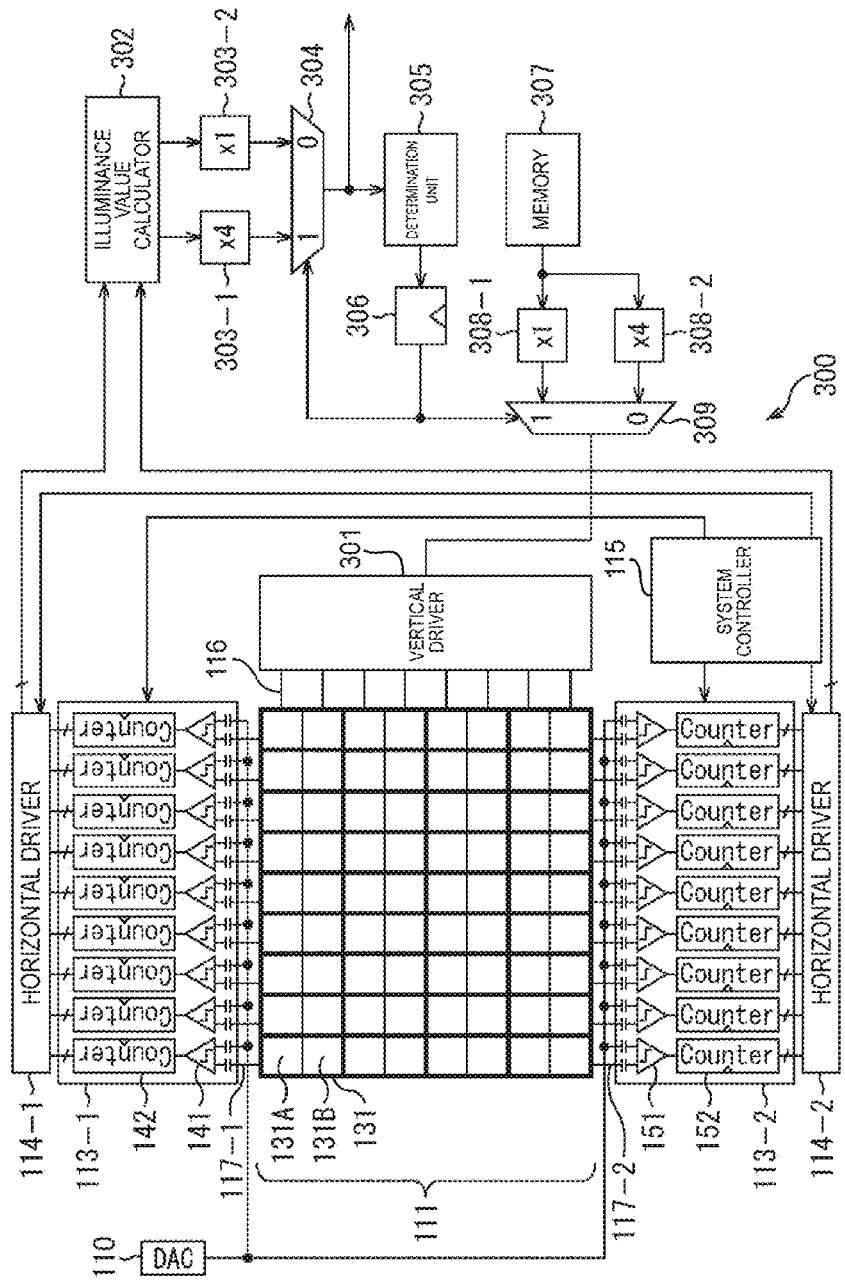
FIG. 14 is a block diagram illustrating an exemplary configuration of a second embodiment of a CMOS image sensor as a solid-state image-capturing element to which the present disclosure is applied.

FIG. 14 is a block diagram illustrating an exemplary configuration of a second embodiment of the CMOS image sensor as a solid-state image-capturing element to which the present disclosure is applied.

In the configuration shown in FIG. 14, the same components as those of FIG. 7 are denoted with the same reference numbers. The repeated description thereof is omitted as appropriate.

The configuration of a CMOS image sensor 300 of FIG. 14 is different from that of the CMOS image sensor 100 of FIG. 7 in that a vertical driver 301 is provided instead of the vertical driver 112, the dynamic-range expander 118 and the integrator 119 are not provided, and an illuminance value calculator 302, multipliers 303-1 and 303-2, a selector 304, a determination unit 305, a register 306, a memory 307, multipliers 308-1 and 308-2, and a selector 309 are further provided.

The illuminance value calculator 302, the multipliers 303-1 and 303-2, the selector 304, the determination unit 305, the register 306, the memory 307, the multipliers 308-1 and 308-2, and the selector 309 are not included in the CMOS image sensor 300, and they may be provided, for example, as an external signal processor such as a DSP on a different substrate from the CMOS image sensor 300.

In the CMOS image sensor 300, the ratio between the exposure times of the long-term accumulation pixel 131B and the short-term accumulation pixel 131A is 1:16. The CMOS image sensor 300 selects a pair of exposure times of the short-term accumulation pixel 131A and the long-term accumulation pixel 131B based on the illuminance value of the previous frame.

Specifically, the vertical driver 301 of the CMOS image sensor 300 is configured to include a shift register, an address decoder, or the like, which is similar to the vertical driver 112 shown in FIG. 7. The vertical driver 301 is a pixel-driving unit for driving the short-term accumulation pixel 131A and the long-term accumulation pixel 131B of the pixel array section 111 in units of rows. The specific configuration of the vertical driver 301 is not illustrated, but the vertical driver 301 is configured to include two scanning systems of a read scanning system and a sweeping scanning system.

The read scanning system is configured similarly to the read scanning system of the vertical driver 112 of FIG. 7. The sweeping scanning system acquires the pair of exposure time of the short-term accumulation pixel 131A and the long-term accumulation pixel 131B from the selector 309. The sweeping scanning system outputs a control pulse from an output end connected to the pixel driving line 116 in each row of the short-term accumulation pixel 131A earlier by the exposure time of the acquired short-term accumulation pixel 131A than the scanning by the read system to sweep out an unnecessary charge from the photodiode of the short-term accumulation pixel 131A. The scanning by the sweeping scanning system allows a so-called electronic shutter operation to be performed sequentially for each of the short-term accumulation pixel 131A.

Furthermore, the sweeping scanning system outputs a control pulse from an output end connected to the pixel driving line 116 in each row of the long-term accumulation pixel 131B earlier by the exposure time of the acquired long-term accumulation pixel 131B than the scanning by the read system to sweep out an unnecessary charge from the photodiode of the long-term accumulation pixel 131B. The scanning by the sweeping scanning system allows a so-called electronic shutter operation to be performed sequentially for each of the long-term accumulation pixel 131B.

The imaging signal outputted from the short-term accumulation pixel 131A in the row selected by the read scanning system of the vertical driver 301 is supplied to the column ADC 113-1 through each of the vertical signal lines 117-1. In addition, the imaging signal outputted from the long-term accumulation pixel 131B in the row selected by the read scanning system of the vertical driver 301 is supplied to the column ADC 113-2 through each of the vertical signal lines 117-2.

The illuminance value calculator 302 functions as a dynamic-range expander, and is configured similarly to the illuminance value calculator 10 of FIG. 2. However, in the CMOS image sensor 300, the ratio between the exposure times of the short-term accumulation pixel 131A and the long-term accumulation pixel 131B is 1:16, and thus the gains of the multipliers of the illuminance value calculator 302 are 1 and 16. This allows the number of bits of the illuminance value to be expanded from 10 bits, which are the number of bits of the pixel value, to 14 bits. The illuminance value calculator 302 supplies the multiplication value obtained by multiplying the addition value of the short-term accumulation pixel 131A calculated as the illuminance value by 16 or the multiplication value obtained by multiplying the addition value of the long-term accumulation pixel 131B by 1 to the multipliers 303-1 and 303-2.

The multiplier 303-1 multiplies the 14-bit illuminance value supplied from the illuminance value calculator 302 by 4 as a gain and supplies the 16-bit multiplication value to the selector 304. The multiplier 303-2 multiplies the 14-bit illuminance value supplied from the illuminance value calculator 302 by 1 as a gain and supplies the 14-bit multiplication value to the selector 304.

The selector 304 selects one of the 16-bit illuminance value supplied from the multiplier 303-1 and the 14-bit illuminance value supplied from the multiplier 303-2 based on an illumination mode signal representing high or low level of the illuminance outputted from the register 306. The selector 304 outputs the selected illuminance value and also outputs it to the determination unit 305. This allows the number of bits of the illuminance value (dynamic range) outputted from the determination unit 305 to be 16 bits.

The determination unit 305 compares the illuminance value supplied from the selector 304 with a threshold and determines the high or low level of the illuminance value. The determination unit 305 supplies the illuminance mode signal representing the determination result to the register 306. The illuminance mode signal is set to 1 for a high illuminance level and is set to 0 for a low illuminance level.

The register 306 holds the illuminance mode signal supplied from the determination unit 305. In addition, the register 306 supplies the held illuminance mode signal to the selector 304 and the selector 309.

The memory 307 stores the pair of exposure times of the short-term accumulation pixel 131A and the long-term accumulation pixel 131B. Here, the memory 307 stores the pair of the exposure time of the short-term accumulation pixel 131A that is set as a value obtained by multiplying the time T by one and the exposure time of the long-term accumulation pixel 131B that is set as a value obtained by multiplying the time T by 16. The memory 307 supplies the pair being held to the multipliers 308-1 and 308-2.

The multiplier 308-1 multiplies the pair supplied from the memory 307 by 1 as a gain. The multiplier 308-1 supplies the pair obtained by the multiplication to the selector 309. The pair to be supplied is constituted by the exposure time of the short-term accumulation pixel 131A that is set as the time T and the exposure time of the long-term accumulation pixel 131B that is set as a value obtained by multiplying the time T by 16.

The multiplier 308-2 multiplies the pair supplied from the memory 307 by 4 as a gain. The multiplier 308-1 supplies the pair obtained by the multiplication to the selector 309. The pair to be supplied is constituted by the exposure time of the short-term accumulation pixel 131A that is set as a value obtained by multiplying the time T by 4 and the exposure time of the long-term accumulation pixel 131B that is set as a value obtained by multiplying the time T by 64.

The selector 309 functions as a selection unit and selects one of the pairs supplied from the multiplier 308-1 and the multiplier 308-2 based on the illuminance mode signal supplied from the register 306. Specifically, when the illuminance mode signal is set to 1, that is, when the illuminance is high, the pair having a smaller magnifying factor supplied from the multiplier 308-1. On the other hand, when the illuminance mode signal is set to 0, that is, when the illuminance is low, the pair having a larger magnifying factor supplied from the multiplier 308-2 is selected.

In this regard, when the illuminance mode signal is set to 1, the selector 304 selects the illuminance value from the multiplier 303-1 in which the gain is 4 that is the same to a multiple of the pair of exposure time. In addition, when the illuminance mode signal is set to 0, the selector 304 selects the illuminance value from the multiplier 303-2 in which the gain is 1 that is the same to a multiple of the pair of exposure time. Thus, the exposure times corresponding to the illuminance values becomes equal regardless of the illuminance mode signal. The selector 309 supplies the selected pair of exposure times of the short-term accumulation pixel 131A and the long-term accumulation pixel 131B to the vertical driver 301.

As described above, in the CMOS image sensor 300, the ratio between the exposure times of the short-term accumulation pixel 131A and the long-term accumulation pixel 131B is 1:16, and thus the gain of the pixel value of the short-term accumulation pixel 131A is 16. Thus, the error of illuminance values due to noise or the like in the column ADC 113-1 is only 16 times. The error of illuminance values is smaller than the case where the ratio between exposure times of the short-term accumulation pixel 131A and the long-term accumulation pixel 131B is 1:64. Consequently, the linearity of illuminance values when the multiplication value of the long-term accumulation pixel 131B and the multiplication value of the short-term accumulation pixel 131A, which are used in the calculation of illuminance values, are switched to each other is improved.

For example, as described with reference to FIG. 6, when the error of pixel values due to noise or the like in the column ADCs 113-1 and 113-2 is ±1LSB, if the ratio between exposure times of the short-term accumulation pixel 131A and the long-term accumulation pixel 131B is 1:64, the error of illuminance values is changed from ±1LSB to ±64LSB when the value used in the calculation of illuminance values is switched. However, in the CMOS image sensor 300, the ratio between exposure times of the short-term accumulation pixel 131A and the long-term accumulation pixel 131B is 1:16, and thus the change in the error of illuminance values ranges from ±1LSB only to ±16LSB.

Description of Threshold in Determination Unit 305

Figure 15:
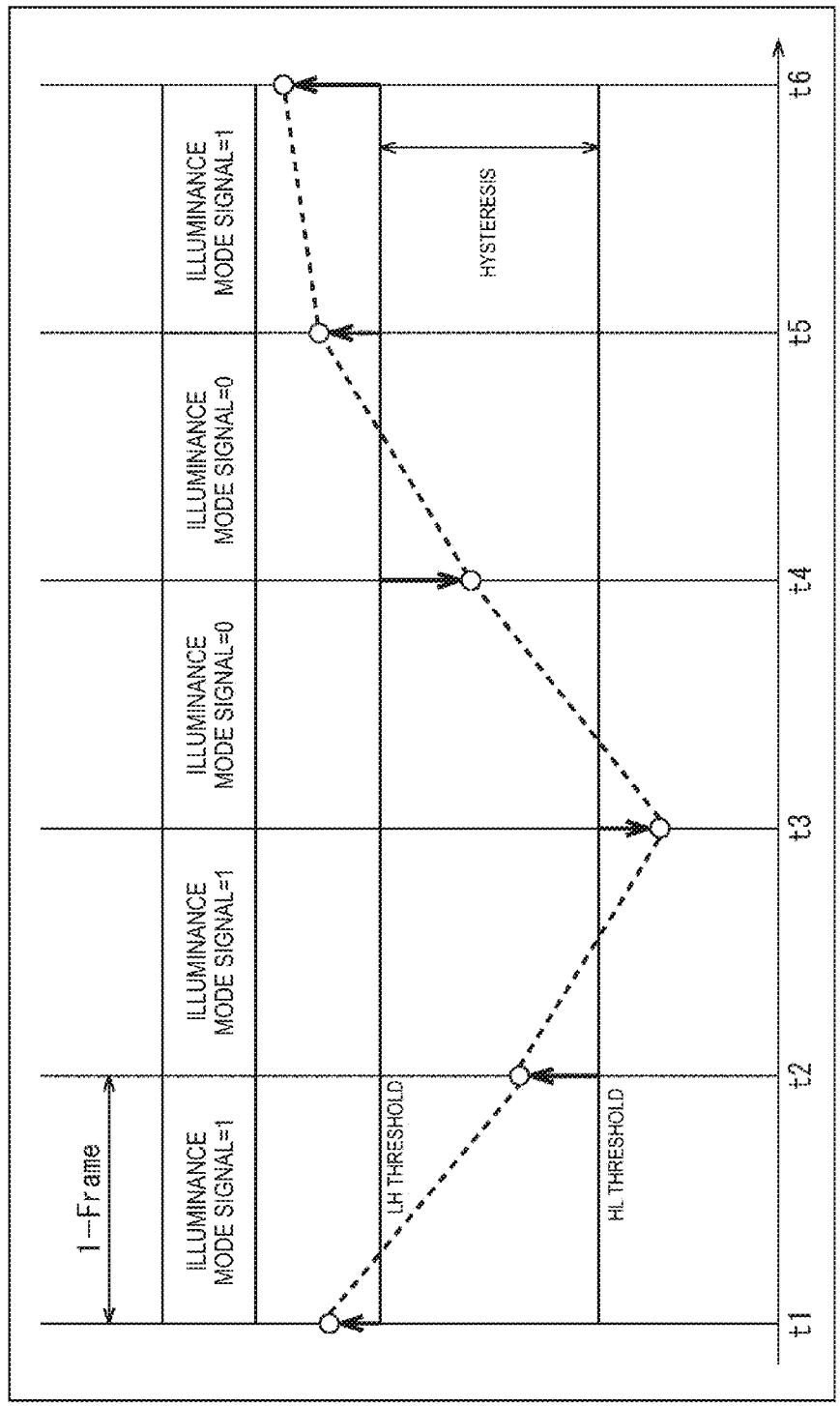
FIG. 15 is a diagram illustrated to describe a threshold in a determination unit of FIG. 14.

FIG. 15 is a diagram illustrated to describe a threshold in the determination unit 305 of FIG. 14.

The horizontal axis in FIG. 15 represents the time.

As shown in FIG. 15, the threshold in the determination unit 305 has hysteresis. In other words, the HL threshold that is a threshold when the illuminance mode signal is changed from 1 to 0 is smaller than the LH threshold that is a threshold when the illuminance mode signal is changed from 0 to 1.

Thus, as shown in FIG. 15, for example, when the illuminance value of the frame at the time t1 is greater than the LH threshold, the illuminance mode signal of the frame is set to 1. Then, when the illuminance value of the frame at the time t2 (t2>t1) is smaller than the LH threshold and is greater than the HL threshold, the illuminance mode signal of the frame is remains unchanged as 1. Then, when the illuminance value of the frame at the time t3 (t3>t2) is smaller than the HL threshold, the illuminance mode signal of the frame is changed to 0. Then, when the illuminance value of the frame at the time t4 (t4>t3) is smaller than the LH threshold and is greater than the HL threshold, the illuminance mode signal of the frame is remains unchanged as 0. Then, when the illuminance value of the frame at the time t5 (t5>t4) is greater than the LH threshold, the illuminance mode signal of the frame is changed to 1. Then, when the illuminance value of the frame at the time t6 (t6>t5) is greater than the LH threshold, the illuminance mode signal of the frame is remains unchanged as 1.

In this way, the threshold in the determination unit 305 has hysteresis, and thus when the illuminance signal is greater than or equal to the HL threshold and is smaller than or equal to the LH threshold, the illuminance mode signal is remained. Thus, it is possible to prevent the occurrence of frequent switching of the illuminance mode signal.

Description of Processing by CMOS Image Sensor 300

Figure 16:
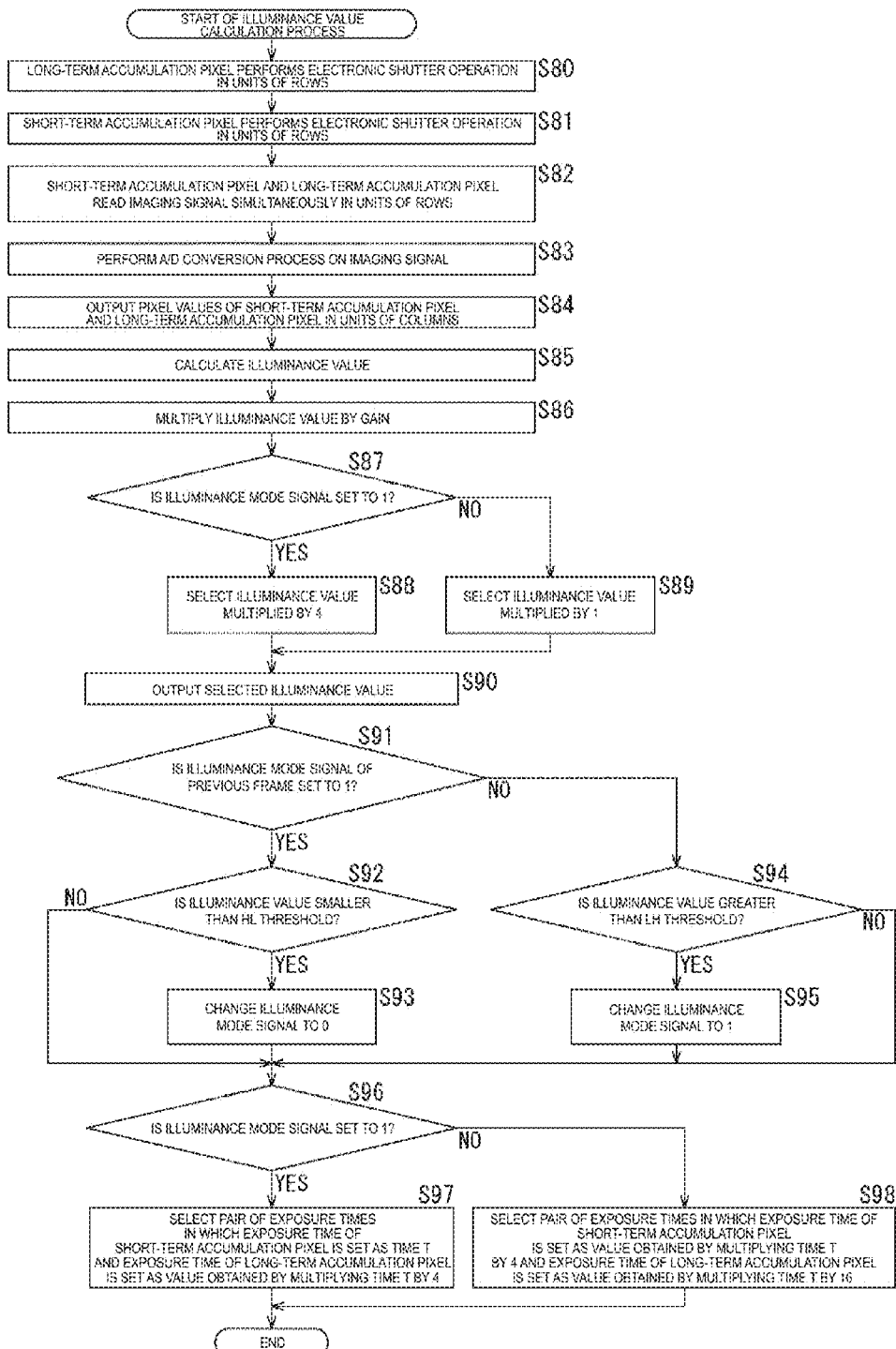
FIG. 16 is a flowchart illustrated to describe an illuminance value calculation process by the CMOS image sensor of FIG. 14.

FIG. 16 is a flowchart illustrated to describe the illuminance value calculation process to be performed by the CMOS image sensor 300 of FIG. 14. The illuminance value calculation process is performed in units of frames.

In step S80 of FIG. 16, the long-term accumulation pixel 131B performs the electronic shutter operation in units of rows, earlier by the exposure time of the long-term accumulation pixel 131B outputted from the selector 309 than the scanning by the read system depending on the control pulse supplied through the pixel driving line 116.

In step S81, the short-term accumulation pixel 131A performs the electronic shutter operation in units of rows, earlier by the exposure time of the short-term accumulation pixel 131A outputted from the selector 309 than the scanning by the read system depending on the control pulse supplied through the pixel driving line 116.

In step S82, the short-term accumulation pixel 131A and the long-term accumulation pixel 131B read an imaging signal simultaneously in units of rows depending on the transfer pulse supplied through the pixel driving line 116. The short-term accumulation pixel 131A supplies the read imaging signal to the column ADC 113-1, and the long-term accumulation pixel 131B supplies the read imaging signal to the column ADC 113-2.

In step S83, the column ADC 113-1 and the column ADC 113-2 perform the A/D conversion process on the inputted imaging signal. The column ADC 113-1 supplies a pixel value obtained by performing the A/D conversion process to the horizontal driver 114-1. The column ADC 113-2 supplies a pixel value obtained by performing the A/D conversion process to the horizontal driver 114-2.

In step S84, the horizontal driver 114-1 outputs the pixel value of the short-term accumulation pixel 131A outputted from the counter 142 to the illuminance value calculator 302 in units of columns. In addition, the horizontal driver 114-2 outputs the pixel value of the long-term accumulation pixel 131B outputted from the counter 152 to the illuminance value calculator 302 in units of columns.

In step S85, the illuminance value calculator 302 calculates a 14-bit illuminance value based on a 10-bit pixel value supplied from the horizontal driver 114-1 and the horizontal driver 114-2. The illuminance value calculator 302 supplies the calculated 14-bit illuminance value to the multiplier 303-1 and the multiplier 303-2.

In step S86, the multiplier 303-1 multiplies the 14-bit illuminance value supplied from the illuminance value calculator 302 by 4 as a gain and supplies a 16-bit multiplication value to the selector 304. The multiplier 303-2 multiplies the 14-bit illuminance value supplied from the illuminance value calculator 302 by 1 as a gain and supplies a 14-bit multiplication value to the selector 304.

In step S87, the selector 304 determines whether the illuminance mode signal outputted from the register 306 is set to 1. If it is determined in step S87 that the illuminance mode signal is set to 1, the process proceeds to step S88.

In step S88, the selector 304 selects the 16-bit illuminance value, which is multiplied by 4, supplied from the multiplier 303-1, and the process proceeds to step S90.

On the other hand, if it is determined in step S87 that the illuminance mode signal is set to 0, in step S89, the selector 304 selects the 14-bit illuminance value, which is multiplied by 1, supplied from the multiplier 303-2. Then, the process proceeds to step S90.

In step S90, the selector 304 outputs the selected illuminance value and also supplies it to the determination unit 305.

In step S91, the determination unit 305 determines whether the illuminance mode signal of the immediately previous frame of the frame to be processed is set to 1. For example, when an initial value of the illuminance mode signal is set to 1 and the frame to be processed is a leading frame, it is determined in the process of step S91 that the illuminance mode signal is set to 1.

If it is determined in step S91 that the illuminance mode signal of the immediately previous frame of the frame to be processed is set to 1, the determination unit 305 determines, in step S92, whether the illuminance value supplied from the selector 304 is smaller than the HL threshold.

If it is determined in step S92 that the illuminance value is smaller than the HL threshold, the determination unit 305 determines, in step S93, that the illuminance value is low and changes the illuminance mode signal to 0. Then, the determination unit 305 supplies the changed illuminance mode signal to the register 306 for holding it therein. When the process of step S93 is completed, the process proceeds to step S96.

On the other hand, if it is determined in step S92 that the illuminance value is greater than or equal to the HL threshold, the determination unit 305 determines that the illuminance value is high and the illuminance modes signal remains unchanged as 1. Then, the determination unit 305 supplies the illuminance mode signal to the register 306 for holding it therein. The process proceeds to step S96.

Furthermore, if it is not determined in step S91 that the illuminance mode signal of the immediately previous frame of the frame to be processed is set to 1, the determination unit 305 determines, in step S94, whether the illuminance value supplied from the selector 304 is greater than the LH threshold.

If it is determined in step S94 that the illuminance value is greater than the LH threshold, the determination unit 305 determines, in step S95, that the illuminance value is high and changes the illuminance mode signal to set to 1. Then, the determination unit 305 supplies the changed illuminance mode signal to the register 306 for holding it therein. The process of step S95 is completed, the process proceeds to step S96.

On the other hand, if it is determined in step S94 that the illuminance value is smaller than or equal to the LH threshold, the determination unit 305 determines that the illuminance value is low, and the illuminance mode signal remains unchanged as 0. Then, the determination unit 305 supplies the illuminance mode signal to the register 306 for holding it therein. The process proceeds to step S96.

The illuminance mode signal held in the register 306 is supplied to the selector 304 and is used in the process of step S87 when the next frame of the current frame to be processed is a frame to be processed newly. In addition, the illuminance mode signal held in the register 306 is supplied to the selector 309 and is used in the process of the immediate next step S96.

In step S96, the selector 309 determines whether the illuminance mode signal supplied from the register 306 is set to 1. If it is determined in step S96 that the illuminance mode signal is set to 1, the process proceeds to step S97.

In step S97, the selector 309 selects the pair of exposure times in which the exposure time of the short-term accumulation pixel 131A is set as the time T and the exposure time of the long-term accumulation pixel 131B is set as a value obtained by multiplying the time T by 4, which is supplied from the multiplier 308-1, and supplies it to the vertical driver 301.

On the other hand, if it is not determined in step S96 that the illuminance mode signal is set to 1, the process proceeds to step S98. In step S98, the selector 309 selects the pair of exposure times in which the exposure time of the short-term accumulation pixel 131A is set as a value obtained by multiplying the time T by 4 and the exposure time of the long-term accumulation pixel 131B is set as a value obtained by multiplying the time T by 16, which is supplied from the multiplier 308-2, and supplies it to the vertical driver 301.

The pair to be supplied to the vertical driver 301 in the process of step S97 or step S98 is the exposure time in the processes of step S80 and step S81 when the next frame of the current frame to be processed is a frame to be processed newly. When the process of step S97 or step S98 is completed, the process is terminated.

As described above, the CMOS image sensor 300 of FIG. 14 selects the pair of exposure times of the short-term accumulation pixel 131A and the long-term accumulation pixel 131B based on the illuminance value of the previous frame. Thus, the CMOS image sensor 300 allows the exposure ratio between the short-term accumulation pixel 131A and the long-term accumulation pixel 131B to be reduced with the expansion of dynamic range of illuminance values.

In other words, when the dynamic range of the number of bits of illuminance value is expanded from 10 bits to 16 bits, it is typically necessary for the exposure ratio between the short-term accumulation pixel 131A and the long-term accumulation pixel 131B to be 1:64. However, the CMOS image sensor 300 selects any pair of T and 16T or 4T and 64T as the exposure time of the short-term accumulation pixel 131A and the long-term accumulation pixel 131B based on the illuminance value. This allows the dynamic range of illuminance values to be expanded from 10 bits to 16 bits while the exposure ratio between the short-term accumulation pixel 131A and the long-term accumulation pixel 131B is 1:16.

Thus, the error of multiplication values of the short-term accumulation pixel 131A due to noise or the like in the column ADC 113-1 is smaller than the case where the exposure ratio between the short-term accumulation pixel 131A and the long-term accumulation pixel 131B 1:64, thereby improving the linearity of illuminance values.

In the CMOS image sensor 300, the illuminance value is classified into two stages of high and low, but it may be classified into three or more stages.

In this case, for example, the dynamic range of illuminance values can be expanded by further providing a multiplier that multiplies the pair of exposure times by a gain that is greater than 4 without changing the ratio of exposure times between the short-term accumulation pixel 131A and the long-term accumulation pixel 131B.

In addition, the error due to noise or the like in the column ADC 113-1 can be reduced while maintaining a wide dynamic range by setting the ratio of exposure times between the short-term accumulation pixel 131A and the long-term accumulation pixel 131B to be smaller than 1:16 (e.g. to be 1:8) without changing the maximum exposure time of the long-term accumulation pixel 131B. Consequently, the linearity of illuminance values can be more improved.

Furthermore, a pair that is more suitable for the illuminance value can be selected by further providing a multiplier that multiplies the pair of exposure times by a gain that is smaller than 4 without changing the ratio of exposure times between the short-term accumulation pixel 131A and the long-term accumulation pixel 131B and without changing the maximum exposure time of the long-term accumulation pixel 131B. Consequently, the linearity of illuminance values can be more improved.

Third Embodiment

Exemplary Configuration of Third Embodiment of CMOS Image Sensor

Figure 17:
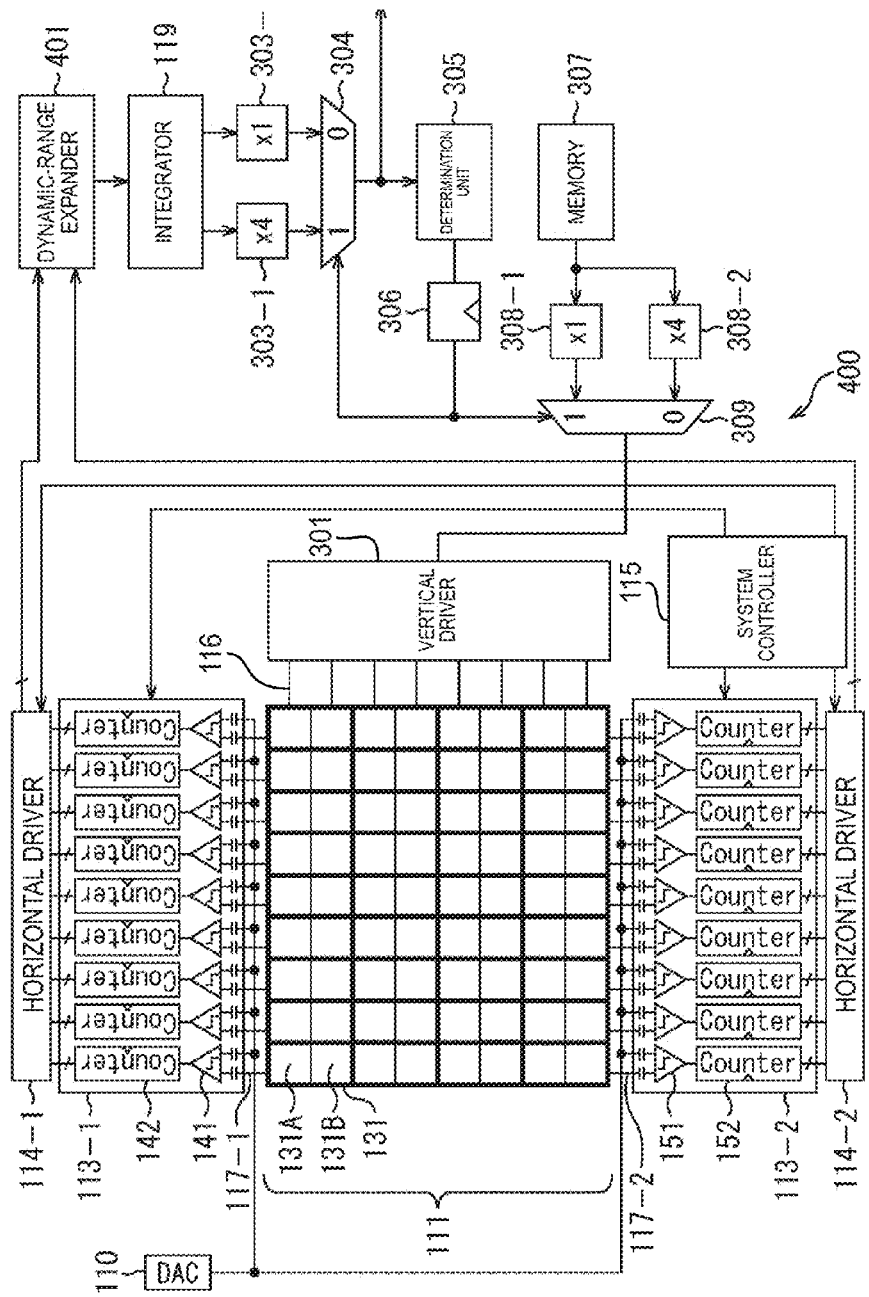
FIG. 17 is a block diagram illustrating an exemplary configuration of a third embodiment of a CMOS image sensor as a solid-state image-capturing element to which the present disclosure is applied.

FIG. 17 is a block diagram illustrating an exemplary configuration of a third embodiment of the CMOS image sensor used as the solid-state image-capturing element to which the present disclosure is applied.

In the configuration shown in FIG. 17, the same components as those of FIGS. 7 and 14 are denoted with the same reference numbers. The repeated description thereof is omitted as appropriate.

The configuration of a CMOS image sensor 400 of FIG. 17 is different from that of the CMOS image sensor 300 of FIG. 14 in that a dynamic-range expander 401 and an integrator 119 are provided instead of the illuminance value calculator 302.

The dynamic-range expander 401, the integrator 119, the multipliers 303-1 and 303-2, the selector 304, the determination unit 305, the register 306, the memory 307, the multipliers 308-1 and 308-2, and the selector 309 are not included in the CMOS image sensor 400, and they may be provided, for example, as an external signal processor such as a DSP on a different substrate from the CMOS image sensor 400.

The CMOS image sensor 400 is a combination of the first embodiment and the second embodiment. In other words, the CMOS image sensor 400 selects the pair of exposure times of the short-term accumulation pixel 131A and the long-term accumulation pixel 131B based on the illuminance value of the previous frame and expands the dynamic range of the pixel value for each pixel.

Specifically, the dynamic-range expander 401 of the CMOS image sensor 400 is similar in configuration to the dynamic-range expander 118 of FIG. 9 except that the gain of the multiplier 171 is 16. The dynamic-range expander 401 determines whether the accumulated charge of the long-term accumulation pixel 131B is saturated or not based on the pixel value of the long-term accumulation pixel 131B. Then, the dynamic-range expander 401 selects the pixel value of the short-term accumulation pixel 131A or the pixel value of the long-term accumulation pixel 131B, which are multiplied by 16, based on the determination result, and supplies the selected pixel value to the integrator 119.

Although not shown, in the illuminance value calculation process by the CMOS image sensor 400, processes of steps S42 to S61 in FIG. 13 are performed instead of the processes of steps S82 to S85 in FIG. 16.

As described above, the CMOS image sensor 400 of FIG. 17 expands the dynamic range of the pixel value for each pixel based on the pixel value having different exposure times and integrates the pixel values having the expanded dynamic range, thereby generating an illuminance value. Thus, it is possible to improve the linearity of illuminance values in the case where the accumulated charge in some of the long-term accumulation pixel 131B is saturated.

Moreover, the CMOS image sensor 400 allows the exposure ratio between the short-term accumulation pixel 131A and the long-term accumulation pixel 131B to be reduced with the expansion of dynamic range of illuminance values by selecting the pair of exposure times of the short-term accumulation pixel 131A and the long-term accumulation pixel 131B based on the illuminance value of the previous frame. Consequently, it is possible to prevent the deterioration in the linearity of illuminance values caused by the difference between the error of the pixel values of the long-term accumulation pixel 131B and the error of the multiplication values of the short-term accumulation pixel 131A.

Another Configuration Example of Pixel Array Section 111

Figure 18:
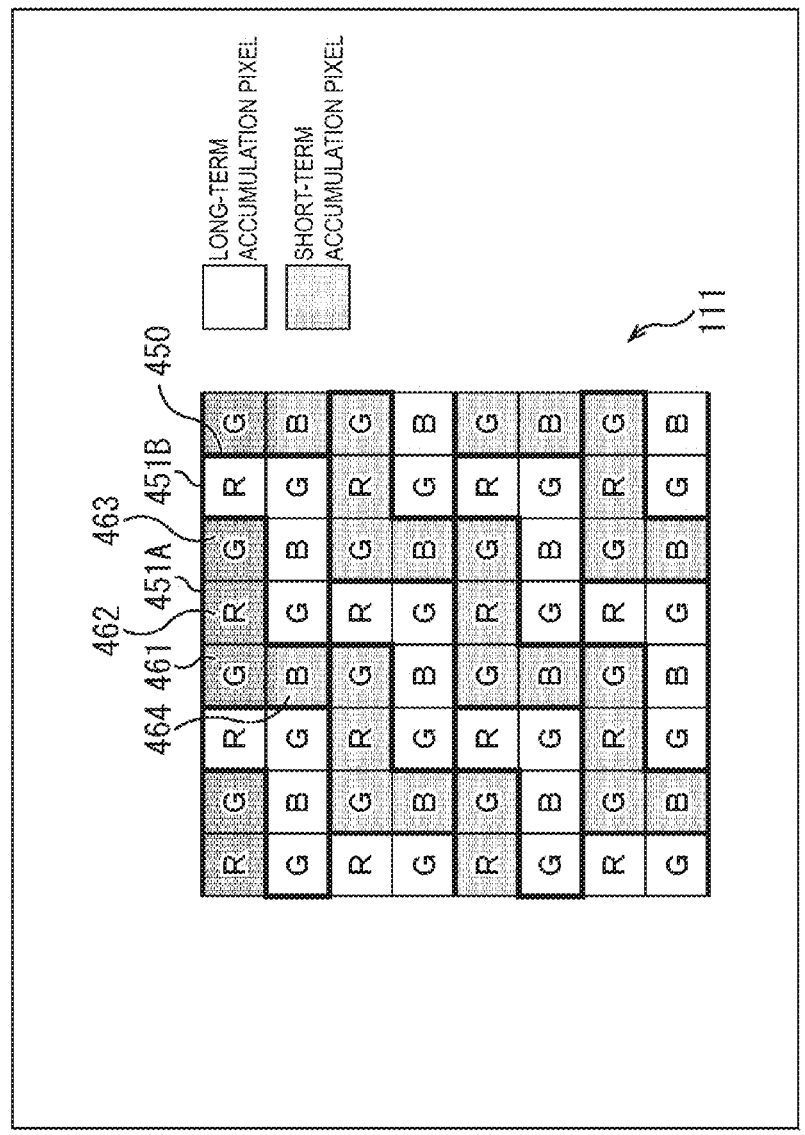
FIG. 18 is a diagram illustrating another exemplary configuration of the short-term accumulation pixel and long-term accumulation pixel of a pixel array section.

FIG. 18 is a diagram illustrating another configuration example of the short-term accumulation pixel and the long-term accumulation pixel in the pixel array section 111.

In FIG. 18, the white square represents the long-term accumulation pixel and the gray square represents the short-term accumulation pixel.

In the pixel array section 111 as described above, the short-term accumulation pixel 131A and the long-term accumulation pixel 131B are arranged regularly in units of row. However, in FIG. 18, sub-pixels having the respective colors of the short-term accumulation pixel 451A and sub-pixels having the respective colors of the long-term accumulation pixel 451B are arranged in a spatially uniform manner.

Specifically, in the example of FIG. 18, the short-term accumulation pixel 451A and the long-term accumulation pixel 451B are formed in such a way that a green (G) sub-pixel 461, a red (R) sub-pixel 462, and a green (G) sub-pixel 463 are arranged in the horizontal direction (row direction) and a blue (B) sub-pixel 464 is adjacent to the sub-pixel 461 in the vertical direction (column direction). In other words, each of the short-term accumulation pixel 451A and the long-term accumulation pixel 451B is an L-shaped sub-pixel group including four sub-pixels 461 to 464.

The short-term accumulation pixel 451A and the long-term accumulation pixel 451B that are arranged to face with each other form one longitudinal pixel 450. In the pixel array section 111 of FIG. 18, such pixels 450 are arranged regularly. In other words, the short-term accumulation pixel 451A and the long-term accumulation pixel 451B are arranged regularly. The array of FIG. 18 is referred to as a uniform exposure array.

Exemplary Configuration of Fourth Embodiment

Exemplary Configuration of One Embodiment of Electronic Device

Figure 19:
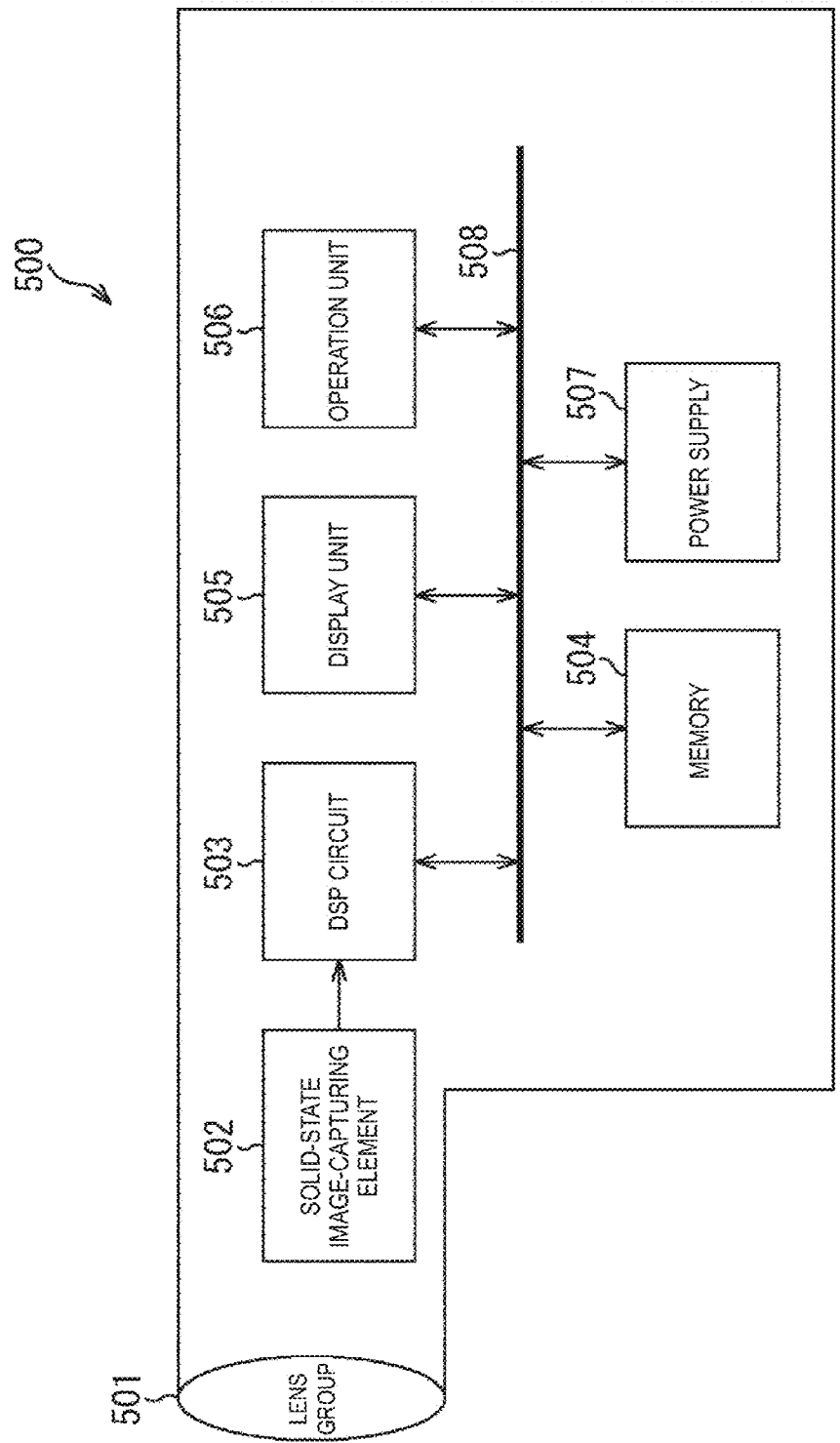
FIG. 19 is a block diagram illustrating an exemplary configuration of an illuminometer used as an electronic device to which the present disclosure is applied.

FIG. 19 is a block diagram illustrating an exemplary configuration of an illuminometer used as an electronic device to which the present disclosure is applied.

An illuminometer 500 of FIG. 19 is configured to include an optical unit 501, a solid-state image-capturing element 502, a DSP circuit 503, a memory 504, a display unit 505, an operation unit 506, and a power supply 507. The DSP circuit 503, the memory 504, the display unit 505, the operation unit 506, and the power supply 507 are interconnected via a bus line 508.

The optical unit 501 is configured to include a lens group or the like, and captures incident light (imaging light) from a subject and forms an image on an imaging surface of the solid-state image-capturing element 502. The solid-state image-capturing element 502 is configured to include a portion of the CMOS image sensor according to the first to third embodiments described above. The solid-state image-capturing element 502 supplies the pixel value, which corresponds to the light amount of the incident light imaged on the imaging surface by the optical unit 501, to the DSP circuit 503.

The DSP circuit 503 is configured to include a portion other than the portion forming the solid-state image-capturing element 502 of the CMOS image sensor according to the first to third embodiments described above. The DSP circuit 503 calculates an illuminance value based on the pixel value supplied from the solid-state image-capturing element 502. The DSP circuit 503 supplies the calculated illuminance value to the memory 504 and also supplies it to the display unit 505.

The memory 504 is configured to include flash memory or the like, and store the illuminance value supplied form the DSP circuit 503.

The display unit 505 is configured to include a panel type display device such as a liquid crystal panel, and displays the illuminance value supplied from the DSP circuit 503.

The operation unit 506 issues an operation command related to various functions of the illuminometer 500 under the operation by the user. The power supply 507 supplies power to the DSP circuit 503, the memory 504, the display unit 505, and the operation unit 506 in an appropriate manner.

The CMOS image sensor according to the first to third embodiments described above may be formed as one chip or may be formed as a module-like configuration, which includes an optical unit or the like packaged therein and has an image-capturing function.

The advantageous effects described herein are illustrative only and are not to be considered restrictive. Other advantageous effects may be obtained.

The embodiments of the present disclosure is not intended to be limited to the embodiments described above, and various modifications and changes can be made without departing from the spirit of the present disclosure.

For example, the exposure ratio between the short-term accumulation pixel 131A and the long-term accumulation pixel 131B is not limited to the example described above, and can be determined depending on the number of bits (dynamic range) of a pixel value and an illuminance value. In addition, the integration of pixel values may be performed by analog addition, not by digital addition.

Furthermore, in the CMOS image sensor 300 or 400, the column ADCs 113-1 and 113-2 and the horizontal drivers 114-1 and 114-2 may be common, which is similar to the CMOS image sensor 200.

Additionally, the present technology may also be configured as below.

(1)

A solid-state image-capturing element including:

a dynamic-range expander configured to expand dynamic range of a pixel value for each pixel based on pixel values having different exposure times of a plurality of pixels; and an integrator configured to integrate the pixel values having the dynamic range expanded by the dynamic-range expander and generate an illuminance value.

(2)

The solid-state image-capturing element according to (1), wherein the pixel includes a short-term accumulation pixel and a long-term accumulation pixel, the short-term accumulation pixel being used to accumulate a charge corresponding to an amount of light incident during a first exposure time, the long-term accumulation pixel being used to accumulate a charge corresponding to an amount of light incident during a second exposure time longer than the first exposure time, and wherein the dynamic-range expander is configured to expand the dynamic range of the pixel value for each pixel formed by the short-term accumulation pixel and the long-term accumulation pixel, based on a pixel value corresponding to the charge accumulated in the short-term accumulation pixel and a pixel value corresponding to the charge accumulated in the long-term accumulation pixel.

(3)

The solid-state image-capturing element according to (2), wherein the dynamic-range expander is configured to set the pixel value of the long-term accumulation pixel as the pixel value having the expanded dynamic range when the charge accumulated in the long-term accumulation pixel is not saturated for each pixel and to set a pixel value of the short-term accumulation pixel being multiplied by a ratio of the second exposure time to the first exposure time as the pixel value having the expanded dynamic range when the charge accumulated in the long-term accumulation pixel is saturated for each pixel.

(4)

The solid-state image-capturing element according to (2) or (3), further including:

a short-term accumulation converter configured to perform an A/D conversion process on an analog signal of the charge accumulated in the short-term accumulation pixel and generate a pixel value as a digital value corresponding to the charge; and a long-term accumulation converter configured to perform an A/D conversion process on an analog signal of the charge accumulated in the long-term accumulation pixel and generate a pixel value as a digital value corresponding to the charge, wherein the dynamic-range expander is configured to expand the dynamic range of the pixel value for each pixel based on the pixel value generated by the short-term accumulation converter and the pixel value generated by the long-term accumulation converter.

(5)

The solid-state image-capturing element according to (2) or (3), further including:

a converter configured to perform an A/D conversion process on an analog signal of the charge accumulated in the short-term accumulation pixel and an analog signal of the charge accumulated in the long-term accumulation pixel and generate a pixel value corresponding to each of the charge; and a storage unit configured to store one of the pixel value of the short-term accumulation pixel generated by the converter and the pixel value of the long-term accumulation pixel generated by the converter, wherein the pixel selector is configured to expand the dynamic range of the pixel value for each pixel based on the pixel value that is converted by the converter and is not stored in the storage unit and the pixel value that is converted by the converter and is stored in the storage unit.

(6)

The solid-state image-capturing element according to any one of (2) to (5), further including:

a selector configured to select a pair of the first exposure time and the second exposure time of a next frame of a frame corresponding to the illuminance value generated by the integrator from multiples of a predetermined pair based on the illuminance value, wherein the short-term accumulation pixel is configured to accumulate a charge corresponding to an amount of light incident during the first exposure time of the pair selected by the selector, and wherein the long-term accumulation pixel is configured to accumulate a charge corresponding to an amount of light incident during the second exposure time of the pair selected by the selector.

(7)

The solid-state image-capturing element according to any one of (1) to (6), wherein the short-term accumulation pixel and the long-term accumulation pixel are configured to be arranged regularly in units of rows.

(8)

The solid-state image-capturing element according to any one of (1) to (7), wherein the short-term accumulation pixels and the long-term accumulation pixels are respectively configured to be arranged regularly as L-shaped pixel groups.

(9)

An electronic device including:

a dynamic-range expander configured to expand dynamic range of a pixel value for each pixel based on pixel values having different exposure times of a plurality of pixels; and an integrator configured to integrate the pixel values having the dynamic range expanded by the dynamic-range expander and generate an illuminance value.

(10)

A solid-state image-capturing element including:
a dynamic-range expander configured to expand dynamic range of an integration value of pixel values of a plurality of pixels based on the pixel value of a first exposure time and the pixel value of a second exposure time of the plurality of pixels;
a multiplier configured to generate, as a illuminance value, a value obtained by multiplying the integration value having the dynamic range expanded by the dynamic-range expander by a gain corresponding to a pair of the first exposure time and the exposure time; and
a selector configured to select the pair of a next frame of a frame corresponding to the illuminance value generated by the multiplier from multiples of a predetermined pair based on the illuminance value.

(11)

The solid-state image-capturing element according to (10),
wherein the selector is configured to select the multiple of the predetermined pair having a small multiplying factor when the illuminance value is greater than or equal to a threshold, and select the multiple of the predetermined pair having a large multiplying factor when the illuminance value is smaller than the threshold.

(12)

The solid-state image-capturing element according to (11),
wherein the selector is configured to set the threshold when the multiple of the predetermined pair having the small multiplying factor is selected to be smaller than the threshold when the multiple of the predetermined pair having the large multiplying factor is selected.

(13)

The solid-state image-capturing element according to any one of (10) to (12),
wherein the pixel includes a short-term accumulation pixel and a long-term accumulation pixel, the short-term accumulation pixel being used to accumulate a charge corresponding to an amount of light incident during the first exposure time, the long-term accumulation pixel being used to accumulate a charge corresponding to an amount of light incident during the second exposure time longer than the first exposure time, and
wherein the dynamic-range expander is configured to expand the dynamic range of the integration value based on a pixel value corresponding to the charge accumulated in the short-term accumulation pixel of each of the plurality of pixels and a pixel value corresponding to the charge accumulated in the long-term accumulation pixel of each of the plurality of pixels.

(14)

The solid-state image-capturing element according to (13),
wherein the short-term accumulation pixel and the long-term accumulation pixel are configured to be arranged regularly in units of rows.

(15)

The solid-state image-capturing element according to (13),
wherein the short-term accumulation pixels and the long-term accumulation pixels are respectively configured to be arranged regularly as L-shaped pixel groups.

(16)

An electronic device including:
a dynamic-range expander configured to expand dynamic range of an integration value of pixel values of a plurality of pixels based on the pixel value of a first exposure time and the pixel value of a second exposure time of the plurality of pixels;
a multiplier configured to generate, as a illuminance value, a value obtained by multiplying the integration value having the dynamic range expanded by the dynamic-range expander by a gain corresponding to a pair of the first exposure time and the exposure time; and
a selector configured to select the pair of a next frame of a frame corresponding to the illuminance value generated by the multiplier from multiples of a predetermined pair based on the illuminance value.

REFERENCE SIGNS LIST

100 CMOS image sensor
113-1, 113-2 column ADC
118 dynamic-range expander
119 integrator
131 pixel
131A short-term accumulation pixel
131B long-term accumulation pixel
200 CMOS image sensor
202 column ADC
300 CMOS image sensor
302 illuminance value calculator
303-1, 303-2 multiplier
309 selector
451A short-term accumulation pixel
451B long-term accumulation pixel
500 illuminometer
502 solid-state image-capturing element
503 DSP circuit

The invention claimed is:

1. A solid-state image-capturing element comprising:
a dynamic-range expander configured to expand dynamic range of a pixel value for each pixel based on pixel values having different exposure times of a plurality of pixels; and
an integrator configured to integrate pixel values having the dynamic range expanded by the dynamic-range expander and generate an illuminance value,
wherein each pixel includes a short-term accumulation pixel and a long-term accumulation pixel, the short-term accumulation pixel being used to accumulate a charge corresponding to an amount of light incident during a first exposure time, the long-term accumulation pixel being used to accumulate a charge corresponding to an amount of light incident during a second exposure time longer than the first exposure time,
wherein the dynamic-range expander is configured to expand the dynamic range of the pixel value for each pixel formed by the short-term accumulation pixel and the long-term accumulation pixel, based on a pixel value corresponding to the charge accumulated in the short-term accumulation pixel and a pixel value corresponding to the charge accumulated in the long-term accumulation pixel,
a selector configured to select a pair of the first exposure time and the second exposure time of a next frame of a frame corresponding to the illuminance value generated by the integrator from multiple ones of a predetermined pair based on the illuminance value,
wherein the short-term accumulation pixel is configured to accumulate a charge corresponding to an amount of light incident during the first exposure time of the pair selected by the selector, and wherein the long-term accumulation pixel is configured to accumulate a charge corresponding to an amount of light incident during the second exposure time of the pair selected by the selector, wherein the selector is configured to select the multiple ones of the predetermined pair having a small multiplying factor when the illuminance value is greater than or equal to a threshold, and select the multiple of the predetermined pair having a large multiplying factor when the illuminance value is smaller than the threshold.

2. The solid-state image-capturing element according to claim 1, wherein the dynamic-range expander is configured to set the pixel value of the long-term accumulation pixel as the pixel value having the expanded dynamic range when the charge accumulated in the long-term accumulation pixel is not saturated for each pixel and to set a pixel value of the short-term accumulation pixel being multiplied by a ratio of the second exposure time to the first exposure time as the pixel value having the expanded dynamic range when the charge accumulated in the long-term accumulation pixel is saturated for each pixel.

3. The solid-state image-capturing element according to claim 1, further comprising:

a short-term accumulation converter configured to perform a first A/D conversion process on an analog signal of the charge accumulated in the short-term accumulation pixel and generate the pixel value as a digital value corresponding to the charge; and a long-term accumulation converter configured to perform a second A/D conversion process on an analog signal of the charge accumulated in the long-term accumulation pixel and generate the pixel value as a digital value corresponding to the charge, wherein the dynamic-range expander is configured to expand the dynamic range of the pixel value for each pixel based on the pixel value generated by the short-term accumulation converter and the pixel value generated by the long-term accumulation converter.

4. The solid-state image-capturing element according to claim 1, further comprising:

a converter configured to perform an A/D conversion process on an analog signal of the charge accumulated in the short-term accumulation pixel and an analog signal of the charge accumulated in the long-term accumulation pixel and generate a pixel value corresponding to each of the charge; and a storage unit configured to store one of the pixel value of the short-term accumulation pixel generated by the converter and the pixel value of the long-term accumulation pixel generated by the converter, wherein a pixel selector is configured to expand the dynamic range of the pixel value for each pixel based on the pixel value that is converted by the converter and is not stored in the storage unit and the pixel value that is converted by the converter and is stored in the storage unit.

5. The solid-state image-capturing element according to claim 1, wherein the short-term accumulation pixel and the long-term accumulation pixel are configured to be arranged regularly in units of rows.

6. The solid-state image-capturing element according to claim 1, wherein the short-term accumulation pixels and the long-term accumulation pixels are respectively configured to be arranged regularly as L-shaped pixel groups.

7. A solid-state image-capturing element comprising:

a dynamic-range expander configured to expand a dynamic range of an integration value of pixel values of a plurality of pixels based on a pixel value of a first exposure time and a pixel value of a second exposure time of the plurality of pixels;

a multiplier configured to generate, as an illuminance value, a value obtained by multiplying the integration value having the dynamic range expanded by the dynamic-range expander by a gain corresponding to a pair of the first exposure time and the exposure time; and a selector configured to select the pair of a next frame of a frame corresponding to the illuminance value generated by the multiplier from multiple ones of a predetermined pair based on the illuminance value, wherein the selector is configured to select the multiple ones of the predetermined pair having a small multiplying factor when the illuminance value is greater than or equal to a threshold, and select the multiple of the predetermined pair having a large multiplying factor when the illuminance value is smaller than the threshold.

8. The solid-state image-capturing element according to claim 7, wherein the selector is configured to set the threshold when the multiple ones of the predetermined pair having the small multiplying factor is selected to be smaller than the threshold when the multiple ones of the predetermined pair having the large multiplying factor is selected.

9. The solid-state image-capturing element according to claim 7, wherein each pixel includes a short-term accumulation pixel and a long-term accumulation pixel, the short-term accumulation pixel being used to accumulate a charge corresponding to an amount of light incident during the first exposure time, the long-term accumulation pixel being used to accumulate a charge corresponding to an amount of light incident during the second exposure time longer than the first exposure time, and wherein the dynamic-range expander is configured to expand the dynamic range of the integration value based on a pixel value corresponding to the charge accumulated in the short-term accumulation pixel of each of the plurality of pixels and a pixel value corresponding to the charge accumulated in the long-term accumulation pixel of each of the plurality of pixels.

10. The solid-state image-capturing element according to claim 9, wherein the short-term accumulation pixel and the long-term accumulation pixel are configured to be arranged regularly in units of rows.

11. The solid-state image-capturing element according to claim 9, wherein the short-term accumulation pixels and the long-term accumulation pixels are respectively configured to be arranged regularly as L-shaped pixel groups.

12. An electronic device comprising:

a dynamic-range expander configured to expand dynamic range of an integration value of pixel values of a plurality of pixels based on a pixel value of a first exposure time and a pixel value of a second exposure time of the plurality of pixels;

a multiplier configured to generate, as a illuminance value, a value obtained by multiplying the integration value having the dynamic range expanded by the dynamic-range expander by a gain corresponding to a pair of the first exposure time and the exposure time; and a selector configured to select the pair of the first exposure time and the second exposure time of a next frame of a frame corresponding to the illuminance value generated by the multiplier from multiple ones of a predetermined pair based on the illuminance value, wherein the selector is configured to select the multiple ones of the predetermined pair having a small multiplying factor when the illuminance value is greater than or equal to a threshold, and select the multiple of the predetermined pair having a large multiplying factor when the illuminance value is smaller than the threshold.

* * * * *